US012668661B2

(12) United States Patent
Biagini et al.

(10) Patent No.: US 12,668,661 B2

(45) Date of Patent: Jun. 30, 2026

(54) PROCESS FOR PREPARING POLYPROPYLENE CARBONATE

(71) Applicant: ENI S.P.A., Rome (IT)

(72) Inventors: Paolo Biagini, Novara (IT); Riccardo Po, Novara (IT); Simona Losio, Garbagnate Milanese (IT); Massimiliano Brivio, Monza (IT)

(73) Assignee: ENI S.P.A., Rome (IT)

( * ) Notice: Subject to any disclaimer, the term of this patent is extended or adjusted under 35 U.S.C. 154(b) by 1270 days.

(21) Appl. No.: 17/609,203

(22) PCT Filed: May 7, 2020

(86) PCT No.: PCT/IB2020/054340

§ 371 (c)(1),
(2) Date: Nov. 5, 2021

(87) PCT Pub. No.: WO2020/229965

PCT Pub. Date: Nov. 19, 2020

(65) Prior Publication Data

US 2022/0220253 A1 Jul. 14, 2022

(30) Foreign Application Priority Data

May 7, 2019 (IT) ........................ 102019000006590

(51) Int. Cl.

| | |
|---|---|
| ***C08G 64/02*** | (2006.01) |
| ***B01J 31/18*** | (2006.01) |
| ***C07F 1/00*** | (2006.01) |
| ***C08G 64/34*** | (2006.01) |

(52) U.S. Cl.

CPC ...... *C08G 64/0208* (2013.01); *B01J 31/1815* (2013.01); *C07F 1/005* (2013.01);

(Continued)

(58) Field of Classification Search

CPC ..... C08G 64/0208; C08G 64/34; C07F 1/005; B01J 2531/31; B01J 2531/62;

(Continued)

(56) References Cited

U.S. PATENT DOCUMENTS 5,990,363 A 11/1999 Wijesekera et al.

FOREIGN PATENT DOCUMENTS

CN 104448283 B * 9/2016
DE 102012209516 A1 12/2012

(Continued)

OTHER PUBLICATIONS

International Search Report dated Nov. 11, 2020 for PCT Appl. No. PCT/IB2020/054340.

Written Opinion dated Nov. 11, 2020 for PCT Appl. No. PCT/IB2020/054340.

Bernard Alexandre et al; "The influence of the metal (A1, Cr and Co) and the substituents of the prophyrin in controlling the reactions involved in the copolymerization of propylene oxide and cyclic anhydrides by porphyrin metal (III) complexes"; Polymers, Elsevier Science Publishers B.V. GB; vol. 54, No. 11; Mar. 6, 2013; pp. 1-8.

(Continued)

*Primary Examiner* — Rabon A Sergent

(74) *Attorney, Agent, or Firm* — Ruggiero McAllister & McMahon LLC

(57) ABSTRACT

There is a process for the preparation of polypropylene carbonate having the step of copolymerization of propylene oxide and carbon dioxide ($CO_2$) in the presence of a catalytic system including:

at least one catalyst selected from complexes of a transition metal having general formula (I):

(I)

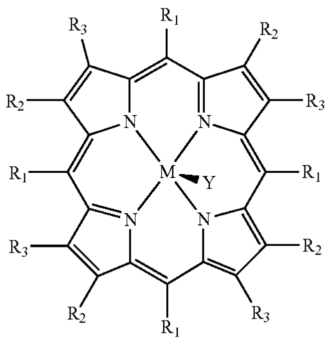

at least one co-catalyst selected from:

(a) ionic compounds having general formula (II):

(II)

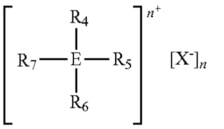

and (b) ionic compounds having general formula (III):

(III)

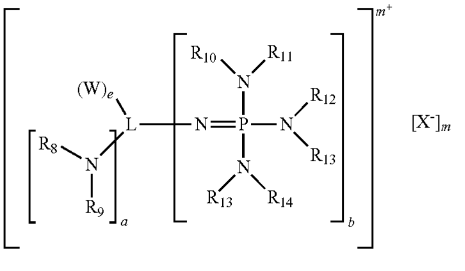

17 Claims, No Drawings

(52) U.S. Cl.
CPC ........... *C08G 64/34* (2013.01); *B01J 2531/31* (2013.01); *B01J 2531/62* (2013.01); *B01J 2531/72* (2013.01); *B01J 2531/84* (2013.01); *B01J 2531/845* (2013.01); *B01J 2540/10* (2013.01)

(58) Field of Classification Search
CPC ................ B01J 2531/72; B01J 2531/84; B01J 2531/845; B01J 2540/10; B01J 31/1815
See application file for complete search history.

(56) References Cited

FOREIGN PATENT DOCUMENTS

| | | | |
|---|---|---|---|
| EP | 0296712 | A2 | 12/1988 |
| EP | 0471561 | A2 | 2/1992 |

OTHER PUBLICATIONS

Jiang Xu et al; "Alternating copolymerization of C02 and propylene oxide catalyzed by C2v-porphyrin cobalt: Selectivity control and kinetic study"; Journal of Catalysis, Academic Press, Duluth, MN, US; vol. 313; Apr. 16, 2014; pp. 159-167.

H. Ogoshi et al; "Synthesis and far-infrared spectra of feric octaethylporphine complexes"; Journal of the American Chemical Society; vol. 95, No. 9; May 1, 1973; pp. 2845-2849.

Manuel A. Torrens et al; "Moessbauer studies on hemin derivatives of .alpha.,.beta.,.gamma.,.delta.-tetraarylporphines"; Journal of the American Chemical Society; vol. 94, No. 12; Jun. 1, 1972; pp. 4162-4167.

* cited by examiner

PROCESS FOR PREPARING POLYPROPYLENE CARBONATE

CROSS-REFERENCE TO RELATED APPLICATIONS

This Patent Application claims priority from PCT Application No. PCT/IB2020/054340, filed May 7, 2020, which claims priority from Italian Patent Application No. 102019000006590 filed on May 7, 2019, the entire disclosures of which is incorporated herein by reference.

FIELD OF THE DISCLOSURE

The present disclosure relates to a process for preparing polypropylene carbonate, disclosure The subject matter of the present disclosure also relates to a catalytic system.

DESCRIPTION OF THE RELATED ART

It is known that aliphatic polycarbonates are biodegradable polymers mainly used in multi-layer compositions for barrier films, as thickeners in the formulation of inks and in the production of gifts and fancy goods. Their interest at industrial level also derives from the fact that aliphatic polycarbonates may be produced without the use of hazardous reagents such as, for example, phosgene, through a process that envisages the copolymerization of an epoxy compound and carbon dioxide ($CO_2$): said process is therefore "eco-friendly" and has greater development prospects especially due to the use of carbon dioxide ($CO_2$) which is considered an easily obtainable and low cost compound.

Since the 1960s many researchers have developed various types of catalytic systems adapted for preparing polycarbonates for alternate copolymerization between an epoxy compound and carbon dioxide ($CO_2$).

For example, Inoue S. et al, in "*Journal of Polymer Science Part C: Polymer Letters*" (1969), Vol. 7, Issue 4, pag. 287-292, describe the use of a heterogeneous catalytic system, insufficiently characterized and obtained by partial hydrolysis of diethylzinc ($ZnEt_2$), in the copolymerization of an epoxy compound and carbon dioxide ($CO_2$). However, the catalyst so obtained, has a very low activity levels, requiring a number of days to produce significant amounts of polycarbonate.

Aida T. et al, in "*Journal of American Chemical Society*" (1983), Vol. 105, pag. 1304-1309, describe the use of aluminium porphyrins for the purpose of activating the carbon dioxide ($CO_2$) which is subsequently reacted with an epoxy compound. Also in this case, the catalytic activity is insufficient (<0.3 turnovers/h).

Darensbourg D. J. et al, in "*Macromolecules*" (1995), Vol. 28, pag. 7577-7579, describe the use of some hindered zinc (II) phenoxides in the copolymerization of an epoxy compound and carbon dioxide ($CO_2$), obtaining catalytic activity up to 2.4 turnover/h.

Over the years, some researchers have proposed the use of catalytic systems based on transition metals and, in particular, the use of chromium(III) or cobalt(III) complexes.

For example, Holmes A. B. et al, in "*Macromolecules*" (2000), Vol. 33(2), pag. 303-308, describe the use of particular chromium(III) porphyrins in the copolymerization of an epoxy compound and carbon dioxide ($CO_2$). In particular, they describe the production of polycarbonates, in particular poly(cyclohexene carbonates) with considerable yields variable around 50%-70% and having not very high molecular weights [i.e. having a number average molecular weight ($M_n$) comprised between 1500 and 3900].

Chen X. et al, in "*Polymer*" (2009), Vol. 50, pag. 441-446, describe the use of a series of chromium(III) complexes/Schiff base N,N'-bis(salicylidene)-1,2-phenyldiamine chromium(III) halides (e.g., [Cr(Salen)Cl]) for producing polypropylene carbonate, with not very high yields (<50%) and unsatisfactory selectivity towards the formation of polypropylene oxide and/or cyclic carbonate, but with interesting molecular weights (number average molecular weight ($M_n$) up to 25000]. Similar results were obtained by Lu X. et al, in "*Science China Chemisry*" (2010), Vol. 53, pag. 1646-1652, who describe the use of complexes based on Co(Salen)Cl for the purpose of producing polypropylene carbonate with yields around 50% and variable molecular weights [number average molecular weights ($M_n$) comprised between 6500 and 30000].

Pescarmona P. P. et al, in the review "*Journal of Applied Polymer Science*" (2014), DOI: 10.1002/APP.41141, effectively describe all the aspects inherent to the reaction between epoxides and carbon dioxide ($CO_2$) reporting the chemical/physical characterization of the polymers obtained and their current potential field of application.

From careful reading of the prior art in relation to the use of catalytic systems based on transition metals for producing polycarbonates it may be deduced that the transition metal complexes proposed as catalysts are activated through the addition of particular co-catalysts that are generally comprised of strong bases such as organic Lewis bases, or organic ionic species such as quaternary ammonium salts or compounds such as bis(triphenylphosphoranylidene)ammonium chloride (PPNCl) having formula (Ia):

(Ia)

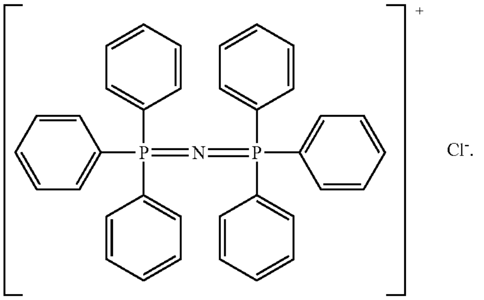

Often the nature of the co-catalyst and the molar ratio with the transition metal complex used, dramatically change the yield and the selectivity of the Copolymerization reaction between the epoxy compound and carbon dioxide ($CO_2$), as well as the characteristics of the polycarbonate obtained.

For example. Darensbourg D. et al, in "*Organometallics*" (2005), Vol. 24(1), pag. 144-148, describe the use of different co-catalysts, for example, bis(triphenylphosphoranylidene)ammonium azide ([PPN][$N_3$]), in the presence of catalysts selected from chromium/salen complexes, in the copolymerization of cyclohexene oxide and carbon dioxide ($CO_2$): subsequently their behaviour is studied and an activation mechanism is proposed.

Lu X. B. et al, in "*Journal of the American Chemical Society*" (2006), Vol. 128(5), pag. 1664-1674, describe the use of different co-catalysts such as, for example, organic ionic ammonium salts or strong organic bases based on sterically hindered amines in the presence of cobalt complexes such as Co(Salen)Cl, in the copolymerization of an epoxy compound and carbon dioxide ($CO_2$): subsequently the selectivity in the production of the polymer, enantioselectivity and stereochemical control are studied.

From the above, the importance of the role of the co-catalyst in the production of polycarbonate is therefore clear for the purpose of having an efficient catalytic system in terms of activity and selectivity, as well as in the determination of the final properties of the polycarbonate obtained.

Since, as mentioned above, the process for obtaining polycarbonate that envisages the copolymerization of an epoxy compound and carbon dioxide ($CO_2$) is "eco-friendly" and of interest especially because of the use of carbon dioxide ($CO_2$) which is considered an easily obtainable and low cost component, the study of new processes for obtaining polycarbonate that envisages the copolymerization of an epoxy compound and carbon dioxide ($CO_2$) is still of great interest.

SUMMARY OF THE DISCLOSURE

The Applicant therefore set out to solve the problem of finding a new process for obtaining polycarbonate, in particular, polypropylene carbonate, through the copolymerization of polypropylene oxide and carbon dioxide ($CO_2$).

The Applicant has now found a process for preparing polypropylene carbonate comprising copolymerizing polypropylene oxide and carbon dioxide ($CO_2$) in the presence of a catalytic system comprising: at least one catalyst selected from complexes of a transition metal; at least one co-catalyst selected from ionic compounds. Said catalytic system allows the properties of polypropylene carbonate to be modulated according to the final use, in particular, in terms of molecular weight [i.e. weight average molecular weight ($M_w$) and number average molecular weight ($M_n$)], of polydispersion index (PDI) corresponding to the ratio between the weight average molecular weight ($M_w$) and the number average molecular weight ($M_n$) (i.e. the ratio $M_w/M_n$). Furthermore, said catalytic system allows polypropylene carbonate to be obtained having a quantity of carbonate linkages in a chain greater than 85%, preferably greater than 95%, even more preferably equal to 100%.

The subject matter of the present disclosure is therefore a process for preparing polypropylene carbonate comprising copolymerizing propylene oxide and carbon dioxide ($CO_2$) in the presence of a catalytic system comprising:

at least one catalyst selected from complexes of a transition metal having general formula (I):

(I)

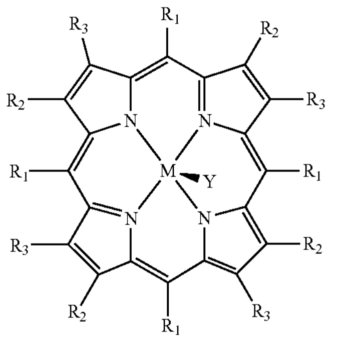

wherein:

M represents a metal atom selected from chromium, manganese, iron, cobalt, nickel, aluminum, preferably chromium, cobalt;

Y represents a halide anion such as, for example, a fluoride anion, a chloride anion, a bromide anion, an iodide anion; or it is selected from inorganic anions such as, for example, azide anion, hydroxide anion, amide anion, perchlorate anion, chlorate anion, sulfate anion, phosphate anion, nitrate anion; or it is selected from organic anions such as, for example, $C_1$-$C_{30}$ carboxylate anions such as, for example, acetate anion, butyrate anion, 2-ethyl-hexanoate anion, acrylate anion, methyl methacrylate anion, benzoate anion, trifluoroacetate anion, $C_1$-$C_{20}$ alcoholate anions such as, for example, methoxide anion, ethoxide anion, tert-butoxide anion, phenoxide anion, 2,4,6-trimethylphenoxide anion, 4-tert-butyl-phenoxide anion, $C_1$-$C_{20}$ thioalcoholate anions such as, for example, thioethoxide anion, thiophenoxide anion, $C_1$-$C_{30}$ alkyl or dialkyl-amide anion such as, for example, di-methyl-amide anion, di-isopropylamide anion, di-phenyl-amide anion; preferably a chloride anion, a bromide anion, an azide anion;

$R_1$ represents a hydrogen atom; or it is selected from linear or branched, saturated or unsaturated, $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in cationic form, optionally substituted cycloalkyl groups, optionally substituted heterocyclic groups, said optionally substituted heterocyclic groups being optionally in cationic form;

$R_2$ and $R_3$, mutually identical or different, represent a hydrogen atom; or they are selected from linear or branched, saturated or unsaturated, $C_1$-$C_{20}$, alkyl groups, preferably $C_1$-$C_{12}$, optionally containing heteroatoms, optionally substituted aryl groups, optionally substituted heteroaryl groups, optionally substituted cycloalkyl groups, optionally substituted heterocyclic groups, optionally substituted trialkyl- or triaryl-silyls groups;

or $R_2$ and $R_3$ may be optionally bound together so as to form, together with the atoms to which they are bound, a saturated, unsaturated or aromatic cycle containing from 3 to 12 carbon atoms, optionally polycondensed, which may be optionally substituted with linear or branched, saturated or unsaturated $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, such cycle optionally containing heteroatoms such as, for example, oxygen, sulfur, nitrogen, silicon, phosphorus, selenium, preferably oxygen, nitrogen;

at least one co-catalyst selected from:

(a) ionic compounds having general formula (II):

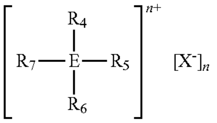

(II)

wherein:

E represents a metal atom selected from phosphorus, arsenic, antimony, bismuth, preferably phosphorus;

$R_4$, $R_5$, $R_6$ and $R_7$, mutually identical or different, represent a hydrogen atom; or they represent a halogen atom such as, for example, fluorine, chlorine, bromine, preferably fluorine, bromine; or they are selected from linear or branched, saturated or unsaturated, $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in cationic form, optionally substituted cycloalkyl groups, optionally substituted heterocyclic groups, said optionally substituted heterocyclic groups being optionally in cationic form;

or $R_4$ and $R_5$ and/or $R_5$ and $R_6$ and/or $R_6$ and $R_7$ and/or $R_7$ and $R_4$ may be optionally bound together so as to form together with the other atoms to which they are bound a saturated, unsaturated or aromatic cycle containing from 1 to 12 carbon atoms, which may be optionally substituted with linear or branched, saturated or unsaturated, $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amino groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

$X^-$ represents a halogen anion such as, for example, a fluoride anion, a chloride anion, a bromide anion, an iodide anion; or it is selected from inorganic anions such as, for example, azide anion, perchlorate anion, chlorate anion, sulfate anion, phosphate anion, nitrate anion, hexafluorophosphate anion, tetrafluoroborate anion; or it is selected from organic anions such as, for example, benzenesulfonate anion, toluenesulfonate anion, dodecylsulfate anion, octylphosphate anion, dodecylphosphate anion, octadecylphosphate anion, phenylphosphate anion, tetraphenylborate anion; preferably a chloride anion, a bromide anion, an azide anion, a tetrafluoroborate anion, a sulfate anion;

n is an integer comprised between 1 and 4, preferably it is 1 or 2;

provided that at least three of $R_4$, $R_5$, $R_6$ and $R_7$ are different from hydrogen;

(b) ionic compounds having general formula (III):

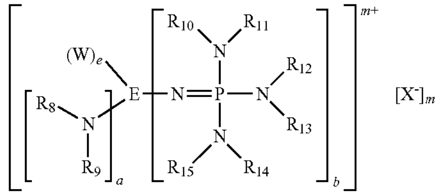

(III)

wherein:

E represents an atom selected from phosphorus, arsenic, antimony, bismuth, preferably phosphorus;

$R_8$, $R_9$, $R_{10}$, $R_{11}$, $R_{12}$, $R_{13}$, $R_{14}$ and $R_{15}$, mutually identical or different, represent a hydrogen atom; or they are selected from linear or branched, saturated or unsaturated $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in cationic form, optionally substituted cycloalkyl groups, optionally substituted heterocyclic groups, said optionally substituted heterocyclic groups being optionally in cationic form, trialkyl- or triaryl-silyl groups;

or $R_8$ and $R_9$, and/or $R_{10}$ and $R_{11}$, and/or $R_{11}$ and $R_{12}$, and/or $R_{12}$ and $R_{13}$, and/or $R_{13}$ and $R_{14}$, and/or $R_{14}$ and $R_{15}$ may be optionally bound together so as to form together with the other atoms to which they are bound a saturated, unsaturated or aromatic cycle containing from 2 to 12 carbon atoms, which may be optionally substituted with linear or branched, saturated or unsaturated $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl amino groups, dialkyl- or diaryl-phosphine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen;

W represents a halogen atom such as, for example, chlorine, bromine, fluorine, iodine, preferably chlorine, bromine; or it is selected from linear or branched, saturated or unsaturated $C_1$-$C_{20}$ alkoxy groups, preferably $C_2$-$C_{10}$, optionally substituted aryloxy groups, oxylamine groups;

$X^-$ represents a halide anion such as, for example, a fluoride anion, a chloride anion, a bromide anion, an iodide anion; or it is selected from inorganic anions such as, for example, azide anion, perchlorate anion, chlorate anion, sulfate anion, phosphate anion, nitrate anion, hexafluorophosphate anion, tetrafluoroborate anion; or it is selected from organic anions such as, for example, benzenesulfonate anion, toluenesulfonate anion, dodecylsulfate anion, octylphosphate anion, dodecylphosphate anion, octadecylphosphate anion, phenylphosphate anion; or it is selected from tetra-alkylborate anions optionally containing heteroatoms such as, for example, oxygen, sulfur, nitrogen, silicon, phosphorus, selenium, preferably oxygen, nitrogen; tetra-arylborate anions optionally containing heteroatoms such as, for example, oxygen, sulfur, nitrogen, silicon, phosphorus, selenium, preferably oxygen, nitrogen; preferably a chloride anion, an azide anion;

a is an integer comprised between 0 and 4, preferably comprised between 1 and 3;

b is an integer comprised between 0 and 4, preferably comprised between 1 and 4;

c is 0 or 1, preferably 0;

provided that the sum a+b+c is equal to 4 and that at least one of a and b is different from 0;

m is an integer comprised between 1 and 4, preferably it is 1 or 2.

It is to be noted that some complexes of a transition metal having general formula (I) ae new.

Therefore, further subject matter of the present disclosure is a complex of a transition metal having general formula (Ia):

(Ia)

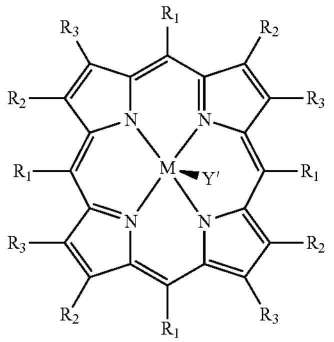

wherein:

M represents a metal atom selected from chromium, manganese, iron, cobalt, nickel, aluminum, preferably chromium, cobalt;

Y' represent an azide anion;

$R_1$ represents a hydrogen atom; or it is selected from linear or branched, saturated or unsaturated, $C_1$-$C_{20}$ alkyl groups, preferably $C_1$-$C_{12}$, optionally containing heteroatoms, optionally substituted aryl groups, optionally substituted heteroaryl groups, said optionally substituted heteroaryl groups being optionally in cationic form, optionally substituted cycloalkyl groups, optionally substituted heterocyclic groups, said optionally substituted heterocyclic groups being optionally in cationic form;

$R_2$ and $R_3$, mutually identical or different, represent a hydrogen atom; or they are selected from linear or branched, saturated or unsaturated, $C_1$-$C_{20}$, alkyl groups, preferably $C_1$-$C_1$2, optionally containing heteroatoms, optionally substituted aryl groups, optionally substituted heteroaryl groups, optionally substituted cycloalkyl groups, optionally substituted heterocyclic groups, optionally substituted trialkyl- or triaryl-silyls group;

or $R_2$ and $R_3$ may be optionally bound together so as to form, together with the atoms to which they are bound, a saturated, unsaturated or aromatic cycle containing from 3 to 12 carbon atoms, optionally polycondensed, which may be optionally substituted with linear or branched, saturated or unsaturated $C_1$-$C_{20}$ alkyl groups, optionally containing heteroatoms, optionally substituted aryl groups, optionally substituted heteroaryl groups, optionally substituted cycloalkyl groups, optionally substituted heterocyclic groups, trialkyl- or triaryl-silyl groups, dialkyl- or diaryl-amine groups, linear or branched, saturated or unsaturated $C_1$-$C_{20}$ alkoxy groups, preferably $C_2$-$C_{10}$, optionally substituted aryloxy groups, optionally substituted thioalkoxy or thioaryloxy groups, cyano groups, said cycle optionally containing heteroatoms such as, for example, oxygen, sulfur, nitrogen, silicon, phosphorus, selenium, preferably oxygen, nitrogen.

More in particular, the present invention relates to a process for the preparation of polypropylene carbonate comprising copolymerizing propylene oxide and carbon dioxide ($CO_2$) in the presence of a catalytic system comprising: at least one catalyst selected from complexes of a transition metal; at least one co-catalyst selected from ionic compounds. inventions comprising: at least one catalyst selected from complexes of a transition metal; at least one co-catalyst selected from ionic compounds

DETAILED DESCRIPTION OF THE DISCLOSURE

For the purpose of the present description and the following claims, the definitions of the numerical intervals always comprise the extreme values unless otherwise specified.

For the purpose of the present description and the following claims, the term "comprising" also includes the terms "which essentially consists of" or "which consists of".

For the purpose of the present description and the following claims, the term "$C_1$-$C_{20}$ alkyl groups" means alkyl groups having 1 to 20 carbon atoms, linear or branched, saturated or unsaturated. Specific examples of $C_1$-$C_{20}$ alkyl groups are: methyl, ethyl, n-propyl, iso-propyl, n-butyl, iso-butyl, ter-butyl, pentyl, hexyl, heptyl, octyl, 2-ethyheptyl, 2-ethylhexyl, 2-butenyl, 2-pentenyl, 2-ethyl-3-hexenyl, 3-octenyl, 1-methyl-4-hexenyl, 2-butyl-3-hexenyl.

For the purpose of the present description and the following claims, the term "$C_1$-$C_{20}$ alkyl groups optionally containing heteroatoms" indicates alkyl groups having from 1 to 20 carbon atoms, linear or branched, saturated or unsaturated, wherein at least one of the hydrogen atoms is substituted with a heteroatom selected from halogens such as, for example, fluorine, chlorine, bromine, preferably fluorine; nitrogen; sulfur, oxygen. Specific examples of $C_1$-$C_{20}$ alkyl groups optionally containing heteroatoms are: fluoromethyl, difluoromethyl, trifluoromethyl, trichloromethyl, 2,2,2-trifluoroethyl, 2,2,2-trichlororoethyl, 2,2,3,3-tetrafluoropropyl, 2,2,3,3,3-pentafluoropropyl, perfluoropentyl, perfluoroctyl, perfluorodecyl, ethyl-2-methoxy, propyl-3-ethoxy, butyl-2-thiomethoxy, hexyl-4-amino, hexyl-3-N, N'-dimethylamino, methyl-N,N'-dioctylamino, 2-methylhexyl-4-amino.

For the purpose of the present description and following claims, the term "aryl groups" indicates aromatic carbocyclic groups containing from 6 to 60 carbon atoms. Said aryl groups may optionally be substituted with one or more groups, mutually identical or different, selected from: halogen atoms such as, for example, fluorine, chlorine, bromine, preferably fluorine; hydroxy groups; $C_1$-$C_{12}$ alkyl groups; $C_1$-$C_{12}$ alkoxy groups; $C_1$-$C_{12}$ thioalkoxy groups; $C_3$-$C_{24}$ tri-alkylsilyl groups; polyethyleneoxy groups; cyano groups; amino groups; $C_1$-$C_{12}$ mono- or di-alkylamine groups; nitro groups. Specific examples of aryl groups are: phenyl, methylphenyl, trimethylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthene, phenanthrene, anthracene.

For the purpose of the present description and following claims, the term "heteroaryl groups" indicates aromatic heterocyclic penta- or hexa-atomic groups, also benzocondensates or heterobicyclic, containing from 4 to 60 carbon atoms and from 1 to 4 heteroatoms selected from nitrogen, oxygen, sulfur, silicon, selenium, phosphorus. Said heteroaryl group may optionally be substituted with one or more groups, mutually identical or different, selected from: halogen atoms such as, for example, fluorine, chlorine, bromine, preferably fluorine; hydroxy groups; $C_1$-$C_{12}$ alkyl groups; $C_1$-$C_{12}$ alkoxy groups; $C_1$-$C_{12}$ thicalkoxy groups; $C_3$-$C_{24}$ tri-alkylsilyl groups; polyethyleneoxy groups; cyano groups; amino groups; $C_1$-$C_{12}$ mono- or di-alkylamine groups; nitro groups. Specific examples of heteroaryl groups are: pyridine, methylpyridine, methoxypyridine, pheaylpyridine, fluoropyridine, pyrimidine, pyridazine, pyrazine, triazine, tetrazine, quinoline, quinoxaline, quinazoline, furan, thiophene, hexylthiophene, bromothiophene, dibromothiophene, pyrrole, oxazole, thiazole, isooxazole, isothiazole oxadiazole, tiadiazole, pyrazole, imidazole, triazole, tetrazole, indole, benzofuran, benzothiophene, benzooxazole, benzothiazole, benzooxadiazole, benzothiadiazole, benzopyrazole, benzimidazole, benzotriazole, triazolopyridine, coumarin. Said optionally substituted heteroaryl groups may optionally be in the cationic form. Specific examples of heteroaryl groups in the cationic form are: pyridinium, N-methyl-pyridinium, N-butyl-pyridinium, N-phenyl-pyridinium, N-methyl-4-methoxy-pyridinium, N-ethyl-2-fluoro-pyridinium, pyrilium, trimethyl-pyrilium, 2,6-di-tert-butyl-pyrilium, 4-phenyl-2,6-dipropyl-pyrilium, 2,6-di-tert-butyl-thiopyrilium, 2,6-diphenyl-thiopyrilium.

For the purpose of the present description and the following claims, the term "cycloalkyl groups" indicates cycloalkyl groups having from 3 to 60 carbon atoms. Said cycloalkyl groups may optionally be substituted with one or more groups, mutually identical or different, selected from: halogen atoms such as, for example, fluorine, chlorine, bromine, preferably fluorine; hydroxy groups; $C_1$-$C_{12}$ alkyl groups; $C_1$-$C_{12}$ alkoxy groups; $C_1$-$C_{12}$ thioalkoxy groups; $C_3$-$C_{24}$ tri-alkylsilyl groups; polyethyleneoxy groups; cyano groups; amino groups; $C_1$-$C_{12}$ mono- or di-alkylamine groups; nitro groups. Specific examples of cycloalkyl groups are: cyclopropyl, 2,2-difluorocyclopropyl, cyclobutyl, cyclopentyl, cyclohexyl, methylcyclohexyl, methoxycyclohexyl, fluorocyclohexyl, phenylcyclohexyl, decalin, abietyl.

For the purpose of the present description and following claims, the term "heterocyclic groups" indicates rings having from 3 to 12 atoms, saturated or unsaturated, containing at least one heteroatom selected from nitrogen, oxygen, sulfur, silicon, selenium, phosphorus, optionally condensed with other aromatic or non-aromatic rings. Said heterocyclic groups may be optionally substituted with one or more groups, mutually identical or different, selected from: halogen atoms such as, for example, fluorine, chlorine, bromine, preferably fluorine, hydroxy groups, $C_1$-$C_{12}$ alkyl groups; $C_1$-$C_{12}$ alkoxy groups; $C_1$-$C_{12}$ thioalkoxy groups; $C_3$-$C_2$ tri-alkylsilyl groups; polyethyleneoxy groups; cyano groups; amino groups; $C_1$-$C_{12}$ mono- or di-alkylamine groups; nitro groups. Specific examples of heterocyclic groups are: pyrrolidine, methoxypyrrolidine, piperidine, fluoropiperidine, methylpiperidine, dihydropyridine, piperazine, morpholine, thiazine, indoline, phenylindoline, 2-ketoazetidine, diketopiperazine, tetrahydrofuran, tetrahydrothiophene. Said optionally substituted heterocyclic groups may optionally be in cationic form. Specific examples of heterocyclic groups in cationic form are: N-butylpyrrolidinium, N,N'-dimethylpyrrolidinium, N,N'-diethylpyrrolidinium, N-ethyl,N'-phenylpyrrolidinium, N,N'-dimethylpiperidinium, N-methyl,N'-butylpiperidinium,N-methyl,N'-phenylpiperidinium.

For the purpose of the present description and following claims, the term "cyclo" indicates a system containing from 1 to 12 carbon atoms, optionally containing heteroatoms selected from nitrogen, oxygen, sulfur, silicon, selenium, phosphorus. Specific examples of cyclo are: toluene, benzonitrile, cycloheptatriene, cyclooctadiene, pyridine, piperidine, tetrahydrofuran, thiadiazole, pyrrole, thiophene, selenophene, tert-butylpyridine.

For the purpose of the present description and following claims, the term "trialkyl- or triaryl-silyl groups" indicates groups comprising a silicon atom to which three $C_1$-$C_{12}$ alkyl groups, or three $C_6$-$C_{24}$ aryl groups, or a combination thereof, are bound. Specific examples of trialkyl- or triaryl-silyl groups are: trimethylsilane, triethylsilane, trihexylsilane, tridodecylsilane, dimethyl(dodecyl)silane, triphenylsilane, methyl(diphenyl)silane, dimethyl(naphthyl)silane.

For the purpose of the present description and following claims, the term "dialkyl- or diaryl-amino groups" indicates groups comprising a nitrogen atom to which two $C_1$-$C_{12}$ alkyl groups, or two $C_6$-$C_{24}$ aryl groups, or a combination thereof, are bound. Specific examples of dialkyl- or diaryl-amino groups are: dimethylamine, diethylamine, dibutylamine, diisobutylamine, diphenylamine, methylphenylamine, dibenzylamine, ditolylamine, dinaphthylamine For the purpose of the present description and following claims, the term "dialkyl- or diaryl-phosphine groups" indicates groups comprising a phosphorus atom to which two $C_1$-$C_{12}$ alkyl groups, or two $C_6$-$C_{24}$ aryl groups, or a combination thereof; are bound. Specific examples of dialkyl- or diaryl-phosphine groups are: dimethylphosphine, diethylphosphine, dibutylphosphine, diphenylphosphine, methylphenylphosphine, dinaphthylphosphine.

For the purpose of the present description and the following claims, the term "$C_1$-$C_{20}$ alkoxy groups" indicates groups comprising an oxygen atom to which a linear or branched $C_1$-$C_{20}$ alkyl group is bound. Specific examples of $C_1$-$C_{20}$ alkoxy groups are: methoxy, ethoxy, n-propoxy, iso-propoxy, n-butoxy, iso-butoxy, tert-butoxy, pentoxy, hexyloxy, heptyloxy, octyloxy, nonyloxy, decyloxy, dodecyloxy.

For the purpose of the present description and the following claims, the term "aryloxy groups" indicates groups comprising an oxygen atom to which a linear or branched $C_6$-$C_{24}$ aryl group is bound. Said aryloxy groups may be optionally substituted with one or more groups, mutually identical or different, selected from: halogen atoms such as, for example, fluorine, chlorine, bromine, preferably fluorine, hydroxy groups, $C_1$-$C_{12}$ alkyl groups; $C_1$-$C_{12}$ alkoxy groups; $C_1$-$C_{12}$ thioalkoxy groups; $C_3$-$C_{24}$ tri-alkylsilyl groups; cyano groups; amino groups; $C_1$-$C_{12}$ mono- or di-alkylamine groups; nitro groups. Specific examples of aryloxy groups are: phenoxy, para-methylphenoxy, para-fluorophenoxy, ortho-butylphenoxy, naphtyloxy, anthracenoxy.

For the purpose of the present description and following claims, the term "thioalkoxy or thioaryloxy groups" indicates groups comprising a sulfur atom to which a $C_1$-$C_{12}$ alkoxy group or a $C_6$-$C_{24}$ aryloxy group is bound. Said thioalkoxy or thioaryloxy groups may be optionally substituted with one or more groups, identical or different, selected from: halogen atoms such as, for example, fluorine, chlorine, bromine, preferably fluorine, hydroxy groups, $C_1$-$C_{12}$ alkyl groups; $C_1$-$C_{12}$ alkoxy groups; $C_1$-$C_{12}$ thioslkoxy groups; $C_3$-$C_{24}$ tri-alkylsilyl groups; cyano groups; amino groups; $C_1$-$C_{12}$ mono- or di-alkylamine groups; nitro groups. Specific examples of thioalkoxy or thioaryloxy groups are: thiomethoxy, thioethoxy, thiopropoxy, thiobutoxy, thio-iso-butoxy, 2-ethylthiohexyloxy, thiophenoxy, para-methylthiophenoxy, para-fluorothiophenoxy, ortho-butylthiophenoxy, napthylthioxy, anthracenylthioxy.

For the purpose of the present description and following claims, the term "oxylamine groups" indicates groups comprising an oxygen atom bound to a nitrogen atom to which two hydrogens are bound, or two linear or branched, saturated or unsaturated $C_1$-$C_{12}$ alkyl groups, optionally containing one or more heteroatoms selected from nitrogen, oxygen, sulfur, silicon, selenium, phosphorus, preferably nitrogen, or two $C_6$-$C_{24}$, aryl groups, or a combination thereof; or said two aryl groups may be bound together so as to form, together with the nitrogen atom, a cycle containing 3 to 12 atoms, preferably from 5 to 6 atoms. Specific examples of oxylamine groups are: hydroxylamine, organic compounds containing sterically hindered oxylamine groups such as, for example, 2,2,5,5-tetramethyl-3-pyrrolinooxyl (PROXYL) and derivatives thereof, 2,2,6,6-tetramethylpiperidine-1-oxyl (TEMPO) and derivatives thereof.

Specific examples of complexes of a transition metal having general formula (I) are indicated in Table 1.

TABLE 1

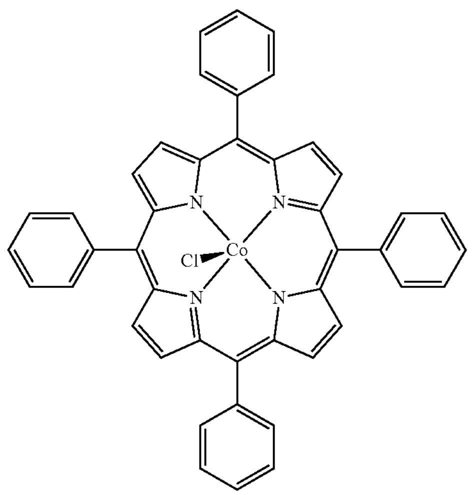

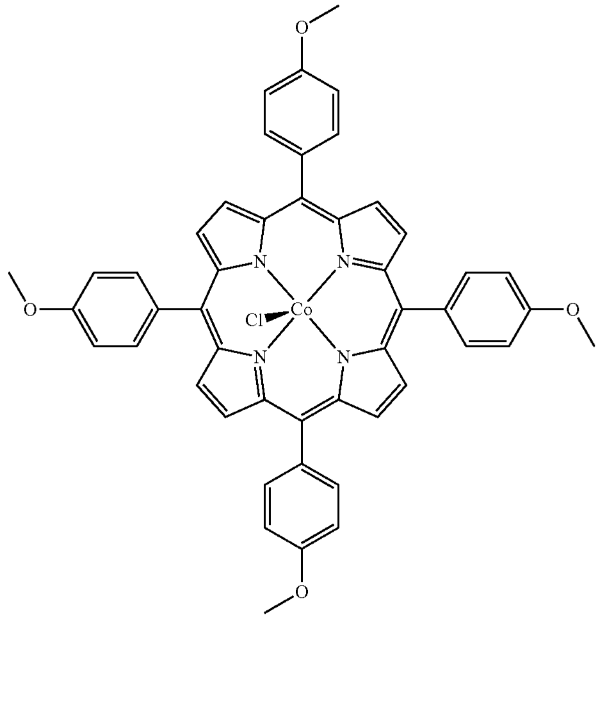

TABLE 1-continued
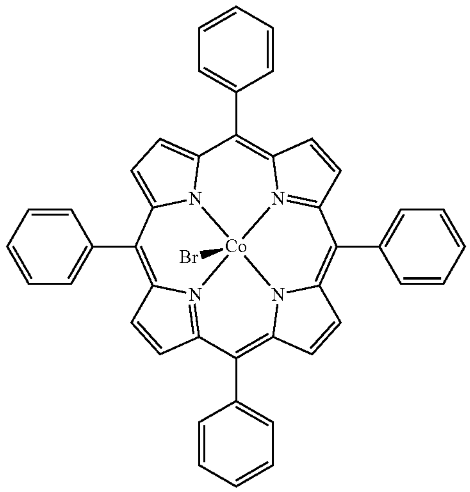
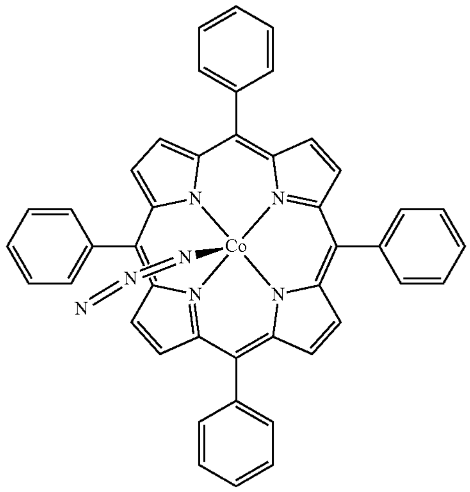
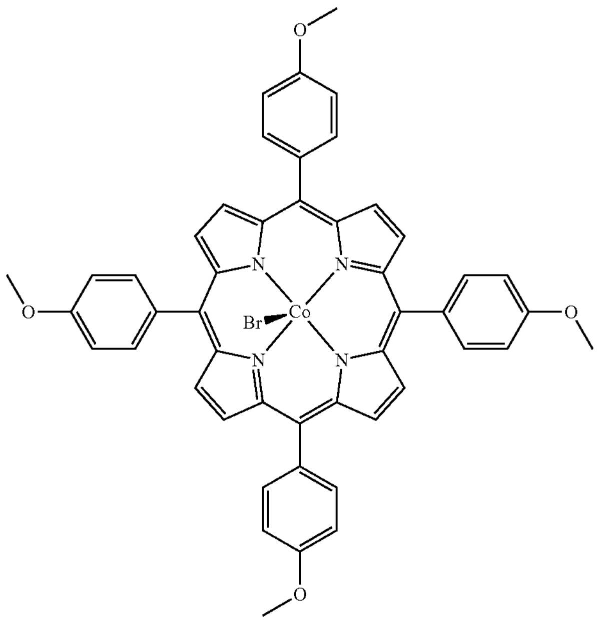

TABLE 1-continued
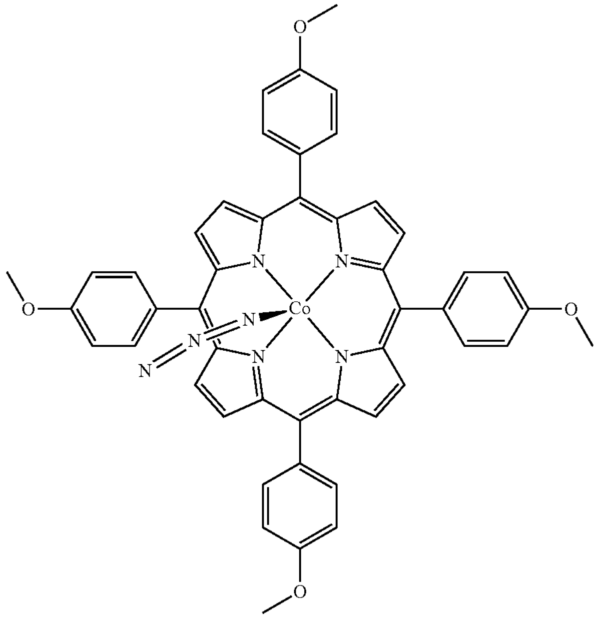
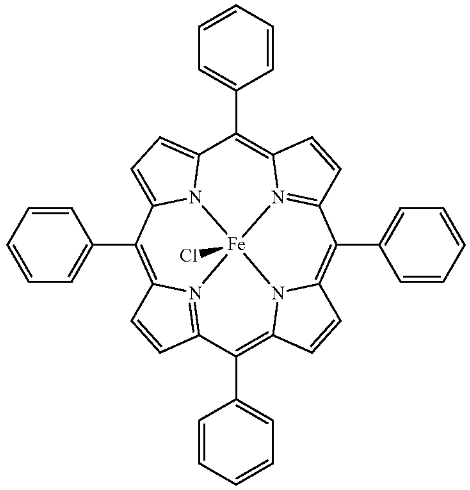
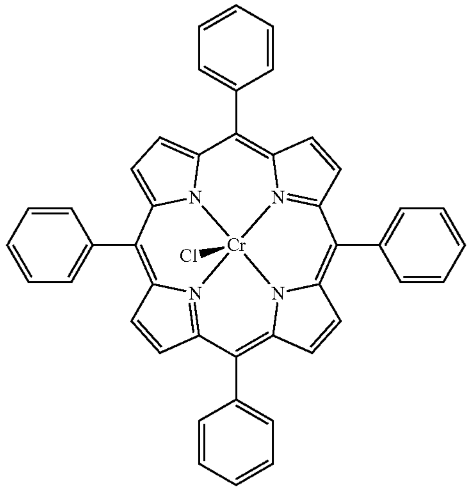

TABLE 1-continued
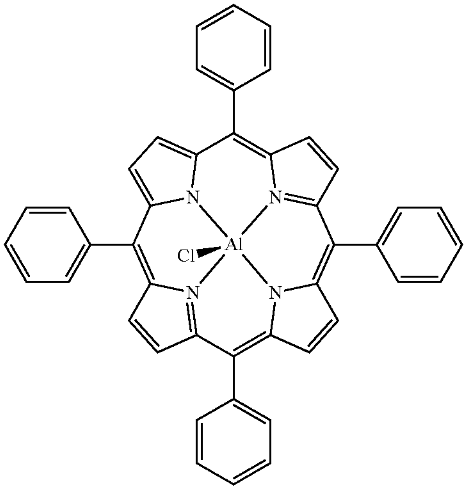
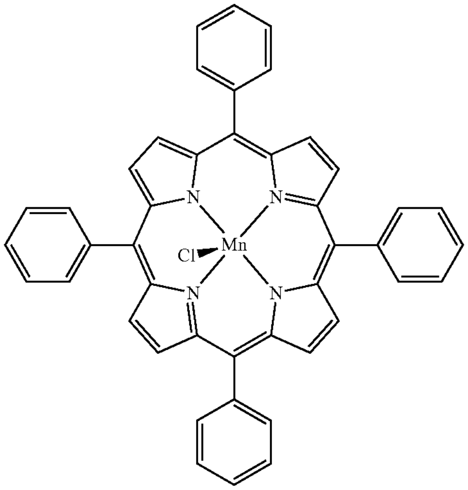
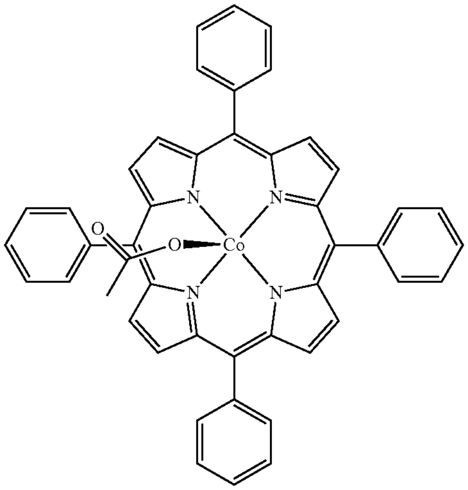

TABLE 1-continued
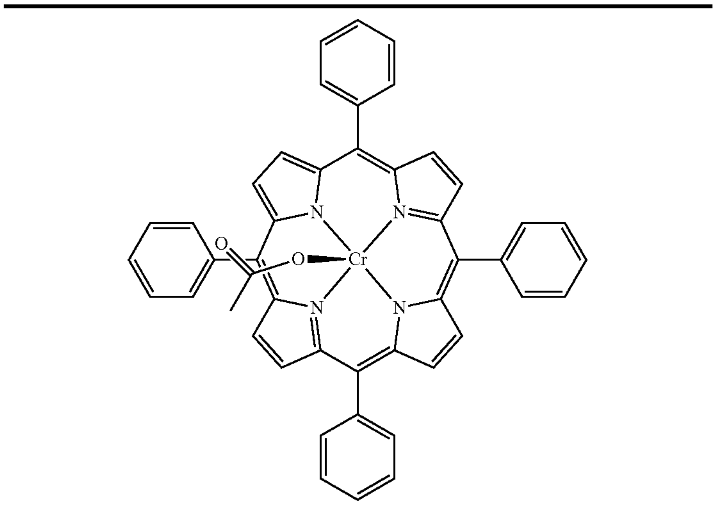
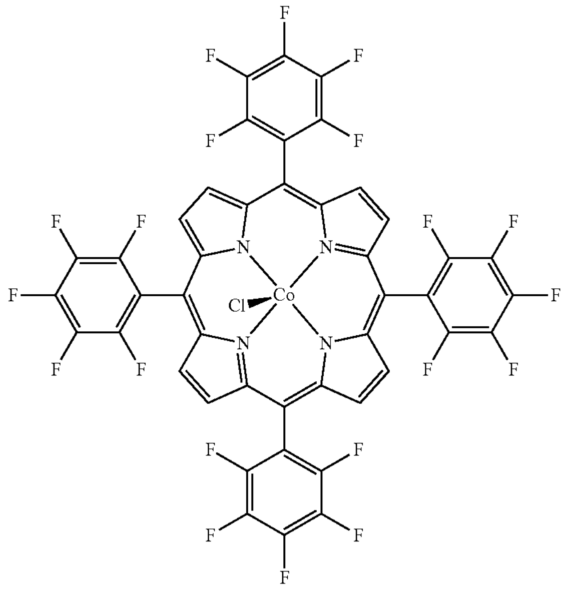
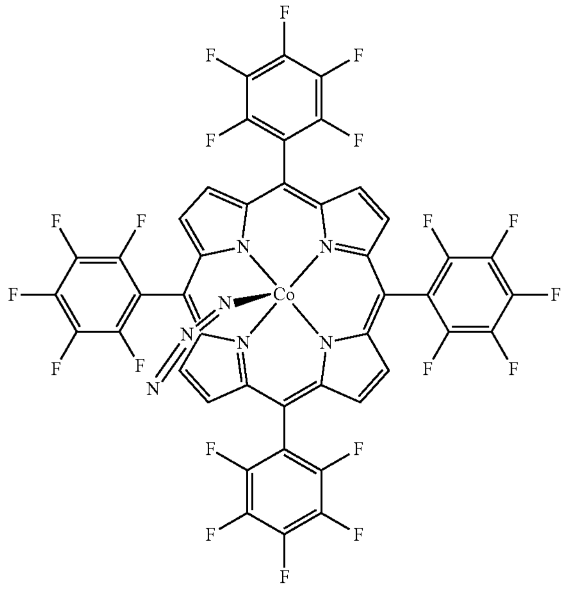

TABLE 1-continued
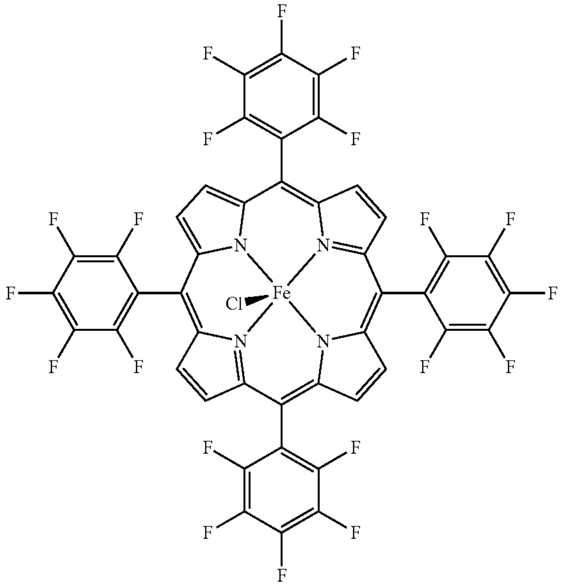
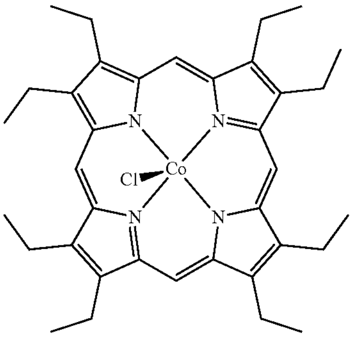
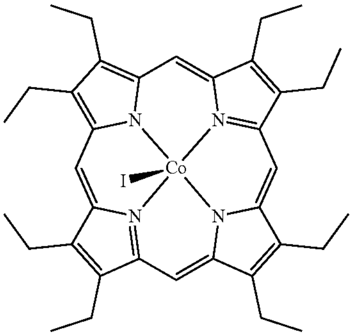
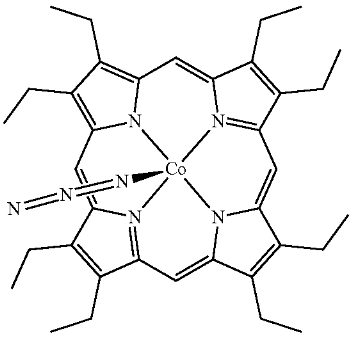

TABLE 1-continued
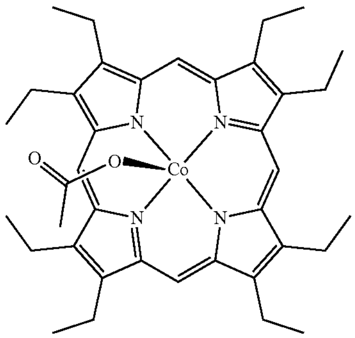
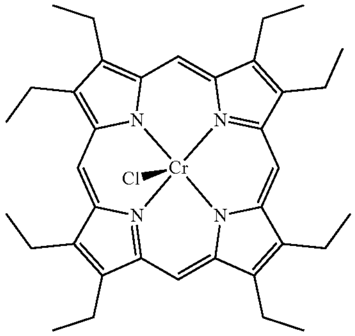
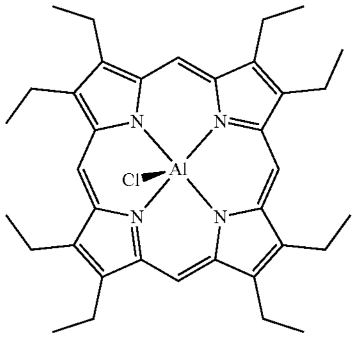
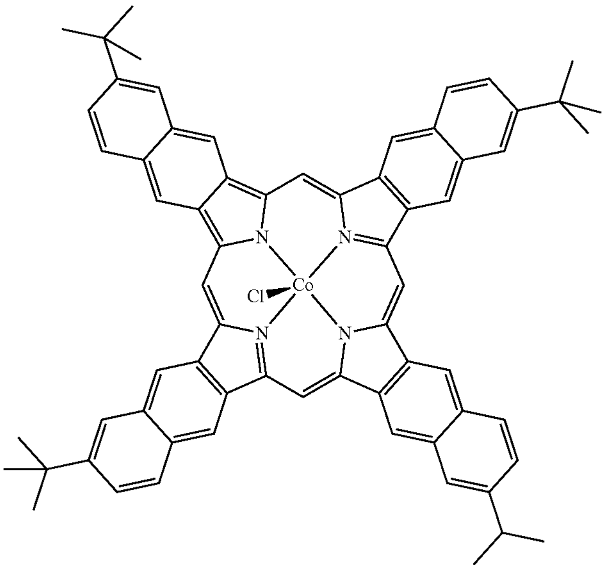

TABLE 1-continued
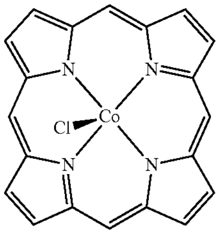
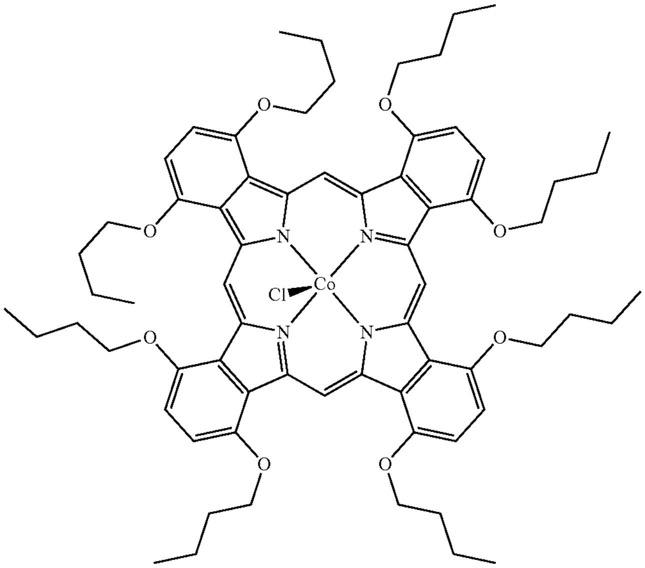
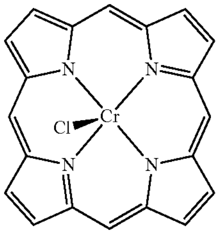
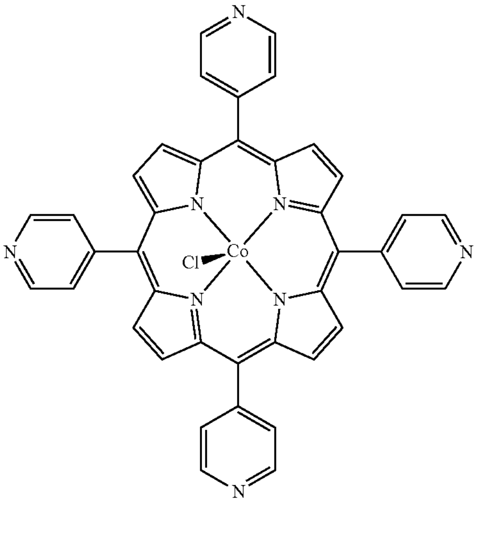

TABLE 1-continued
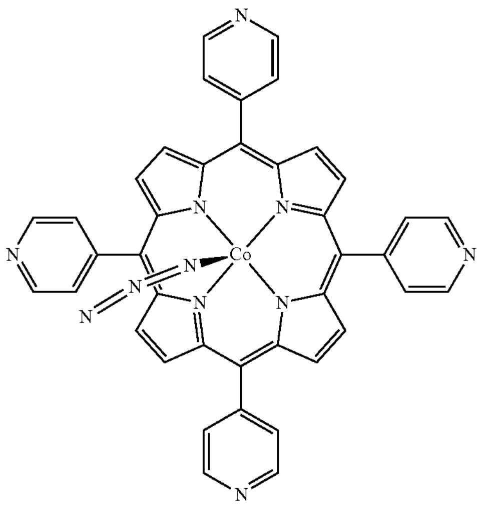
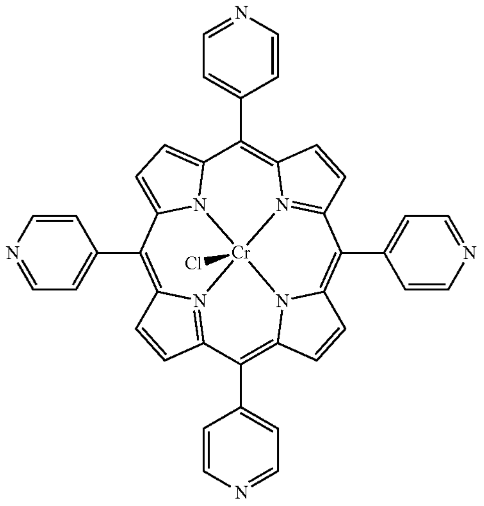
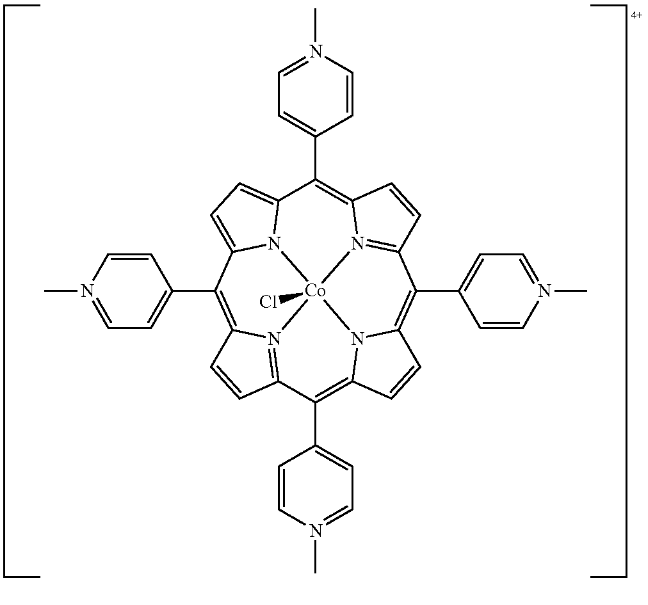
$(Cl^-)_4$

TABLE 1-continued
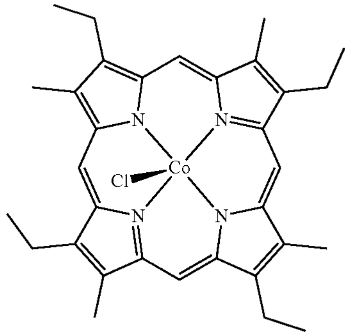
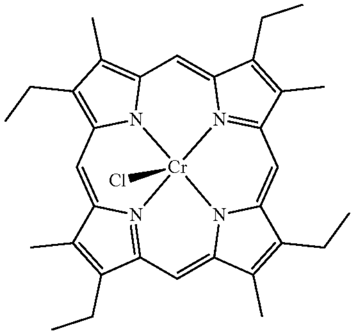
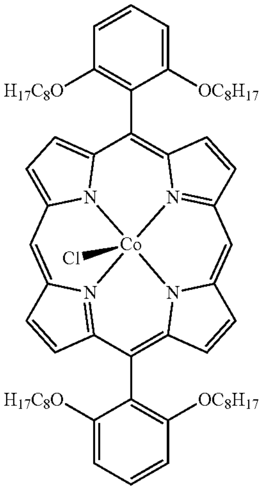
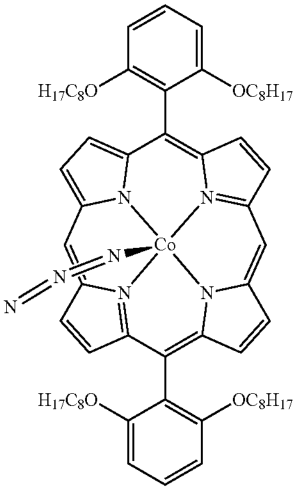

TABLE 1-continued

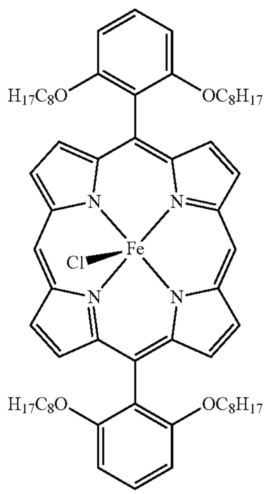

The complexes of a transition metal having general formula (I) may be prepared according to known processes in the prior art as described, for example, by Qin Y. et al in "*Chinese Journal of Polymer Science*" (2011), Vol. 5, pag. 602608: further details related to the preparation of said complexes of a transition metal having general formula (I) may be found in the following examples.

Alternatively, some of said complexes of a transition metal having general formula (I) may be prepared by means of a new process.

Further subject matter of the present disclosure is therefore a process for preparing a transition metal complex having general formula (Ib):

(Ib)

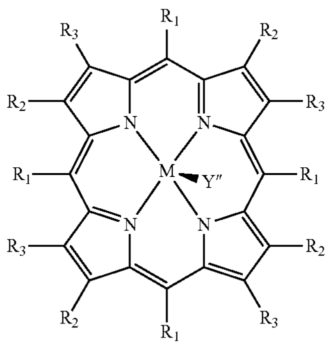

wherein M, $R_1$, $R_2$ and $R_3$, have the same meanings reported above and Y" represents a halogen anion such as, for example, a fluoride anion, a chloride anion, a bromide anion, an iodide anion, comprising reacting a transition metal complex having general formula (IV):

(IV)

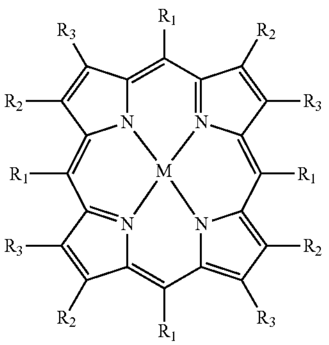

wherein M, $R_1$, $R_2$ and $R_3$, have the same meanings reported above, in the presence of at least one organic solvent selected, for example, from halogenated solvents such as, for example, trichloromethane, dichloromethane, 1,2-dichloroethane, 1,1,1-trichloroethane, chlorobenzene, or mixtures thereof, preferably trichloromethane; alcohols such as, for example, methanol, ethanol, iso-propanol, butanol, 1-octanol, or mixtures thereof, preferably methanol; with at least one hydrogen halide acid such as, for example, hydrochloric acid, hydrobromic acid, hydroiodic acid, hydrofluoric acid, or mixtures thereof, preferably hydrochloric acid; characterized in that to the mixture between said transition metal complex having general formula (IV) and said organic solvent:

- a first aliquot of said at least one hydrogen halide acid is added and the mixture obtained is left to react, at a temperature comprised between 30° C. and 70° C., preferably comprised between 40° C. and 60° C., for a time comprised between 3 hours and 7 hours, preferably comprised between 4 hours and 6 hours; and subsequently
- a second aliquot of said at least one hydrogen halide acid is added and the mixture obtained is left to react, at a temperature comprised between 30° C. and 70° C., preferably between 40° C. and 60° C., for a time comprised between 8 hours and 15 hours, preferably comprised between 10 hours and 13 hours; and subsequently a third aliquot of said at least one hydrogen halide acid is added and the mixture obtained is left to react, at a temperature comprised between 30° C. and 70° C., preferably comprised between 40° C. and 60° C., for a time comprised between 18 hours and 30 hours, preferably comprised between 20 hours and 26 hours.

Specific examples of ionic compounds having general formula (II) are indicated in Table 2.

TABLE 2

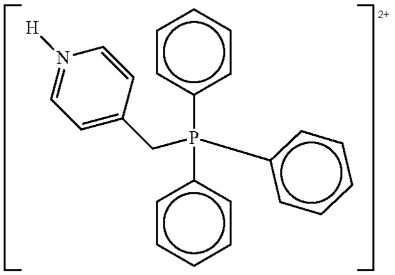
$(Cl^-)_2$

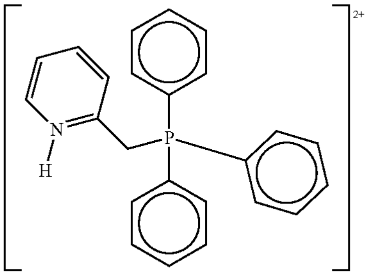
$(Cl^-)_2$

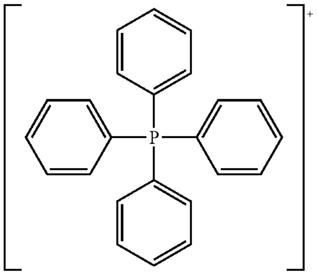
$Cl^-$

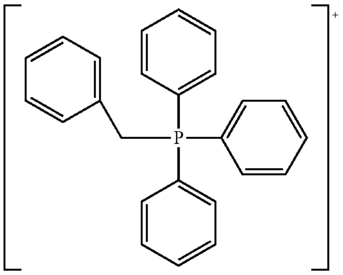
$Cl^-$

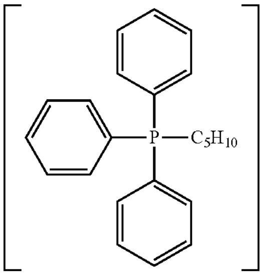
SOOO–

TABLE 2-continued

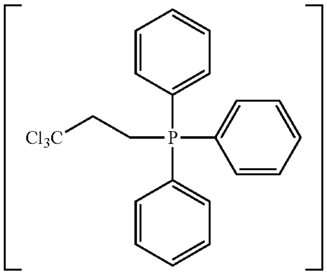
$Cl^-$

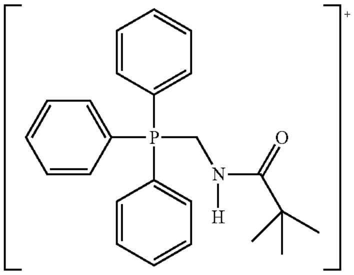
$Cl^-$

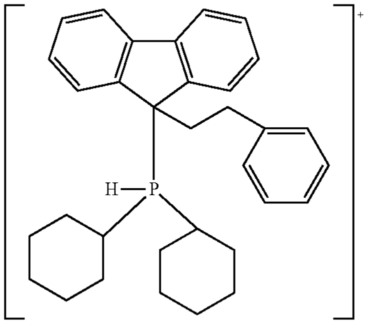
$BF_4^-$

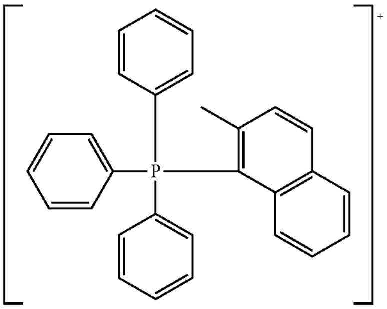
$Br^-$

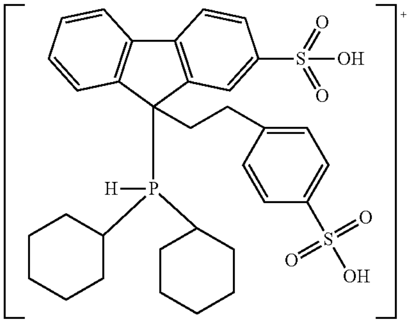
$HSO_4^-$

TABLE 2-continued
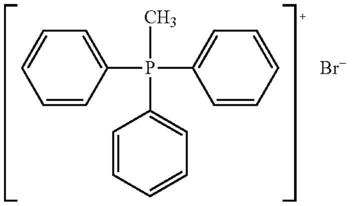
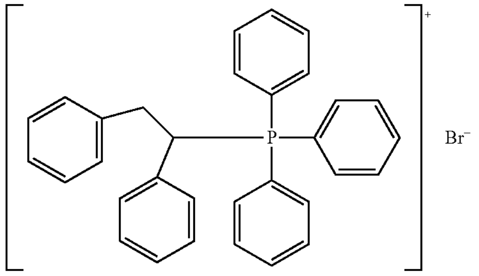
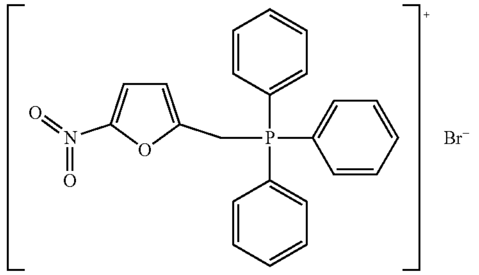
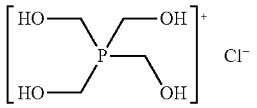
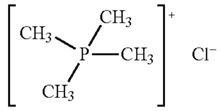
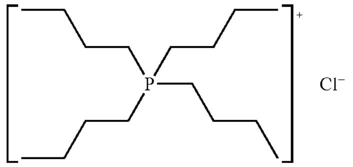
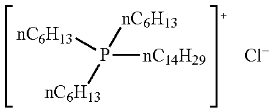
TABLE 2-continued
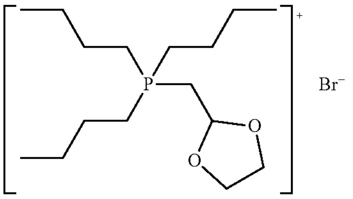
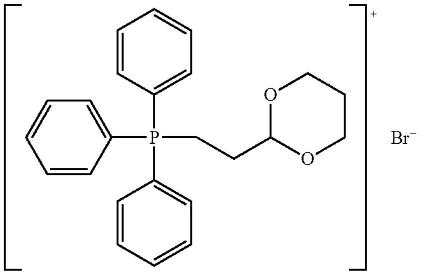
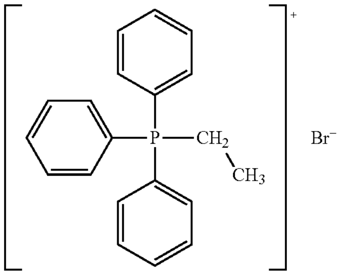
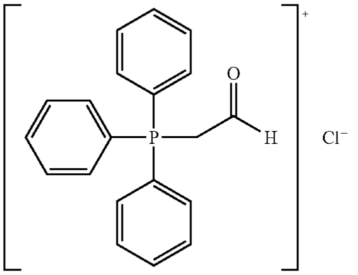
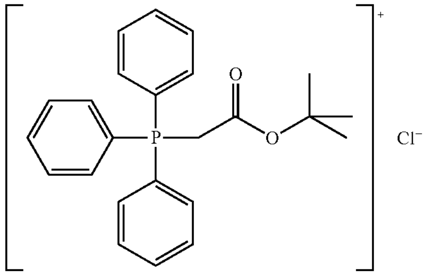

TABLE 2-continued

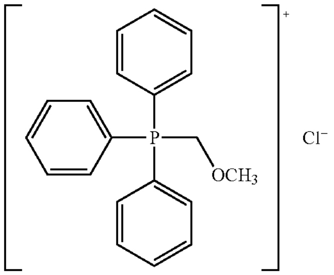

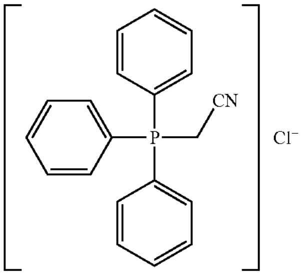

TABLE 2-continued

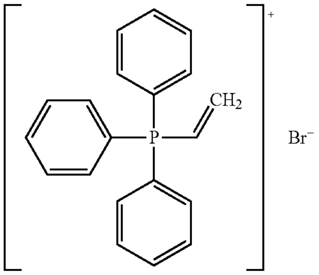

The ionic compounds having general formula (II) may be prepared according to known processes in the prior art as described, for example. Cristau H. J. et al, in "*The Chemistry of Organophosphorus Compounds*" Vol. 3, Chapter 2: *"Preparation, properties and reactions of phosphonium salts*", pag. 47-163, Edited by F. R. Hartley, 1994 John Wiley & Sons. Some ionic compounds having general formula (II) are, instead, commercially available.

Specific examples of ionic compounds having general formula (III) are indicated in Table 3.

TABLE 3

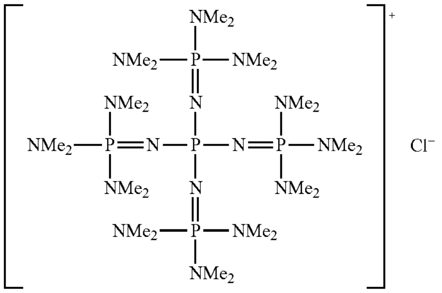

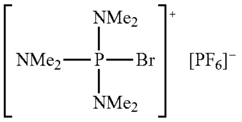

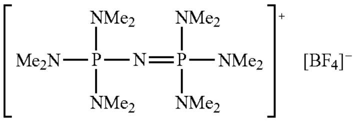

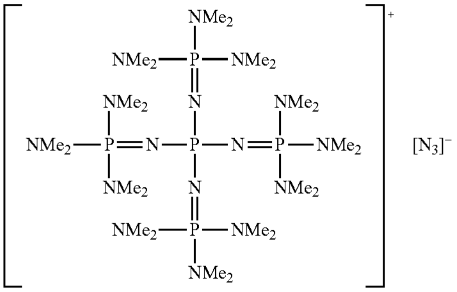

TABLE 3-continued
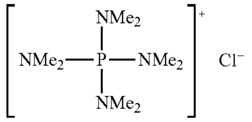
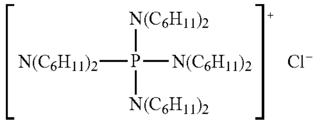
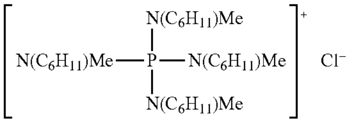
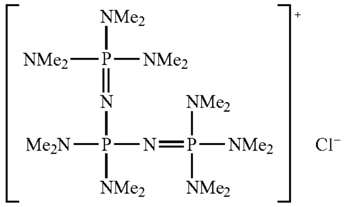
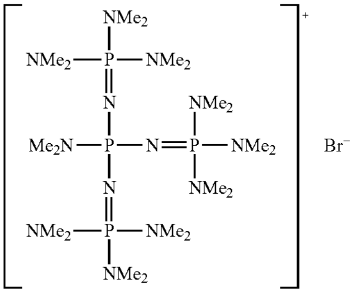
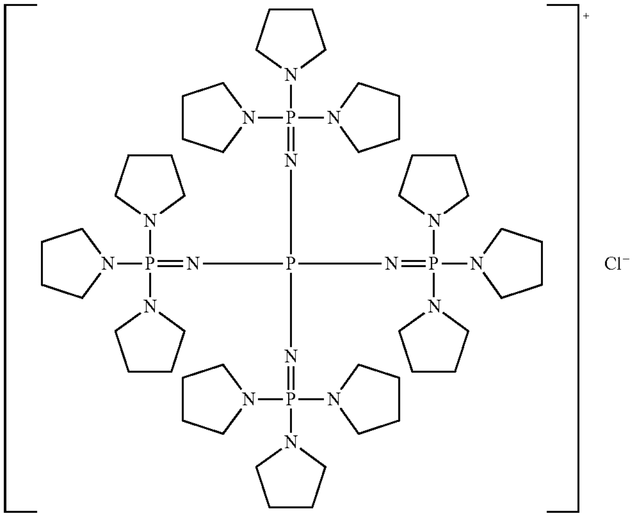

TABLE 3-continued
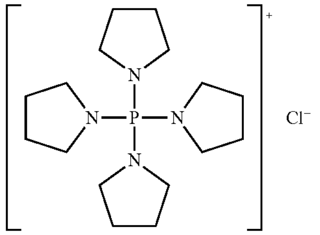
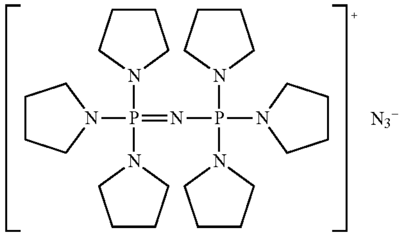
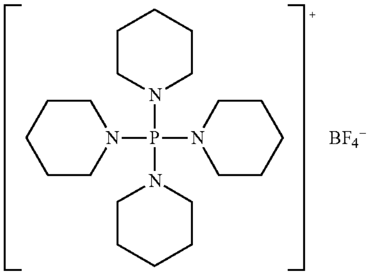
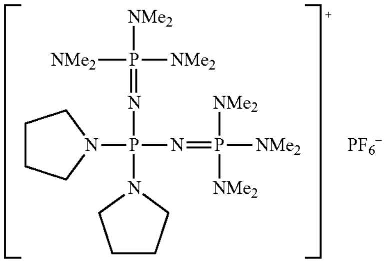
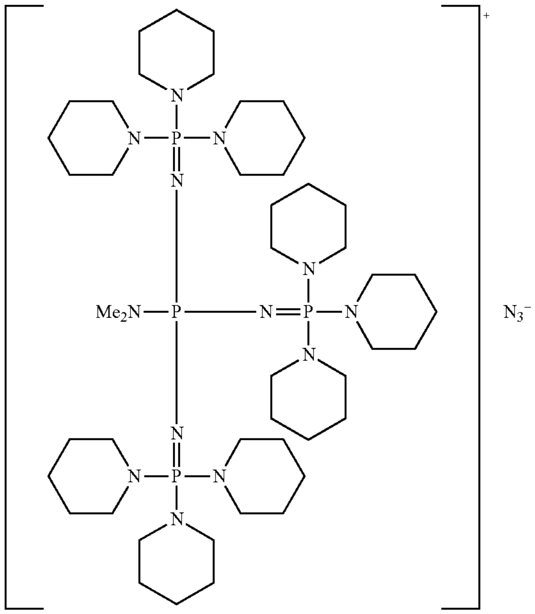

TABLE 3-continued
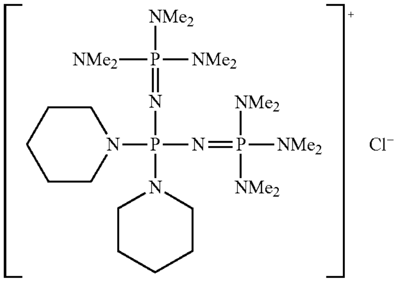
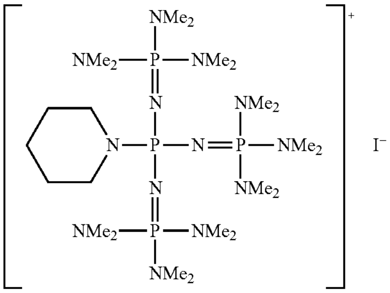
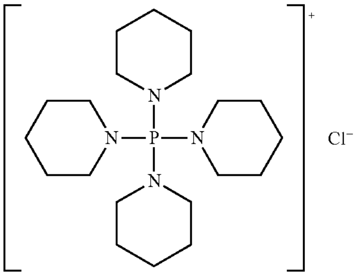
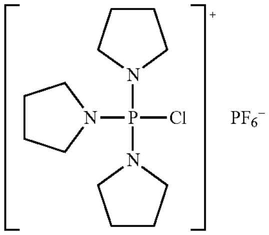
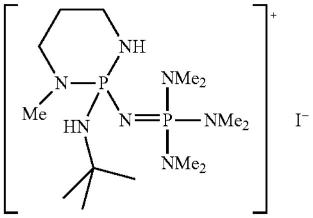
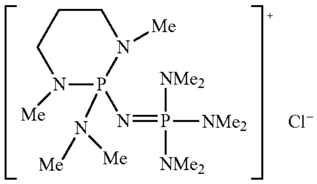

TABLE 3-continued
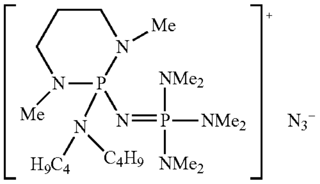
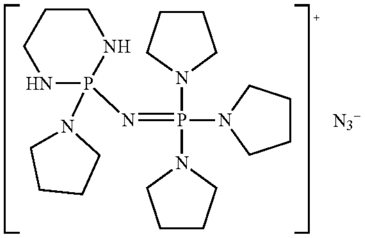
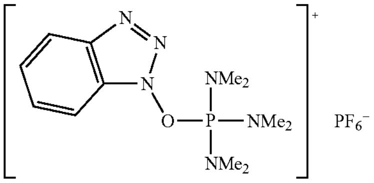
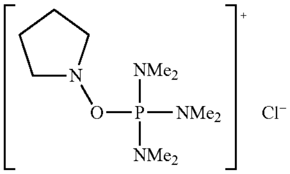
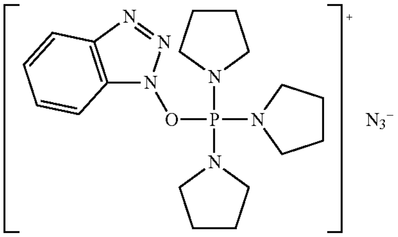
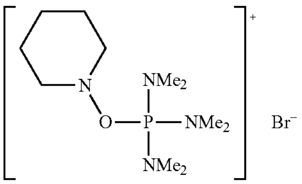
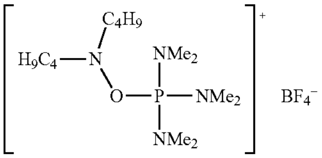

TABLE 3-continued

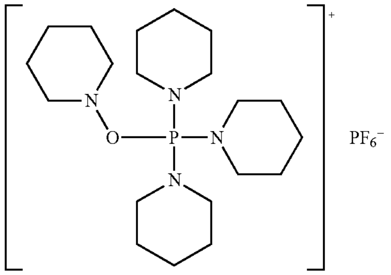

The ionic compounds having general formula (III) may be prepared according to procedures known in the prior art as described, for example, by Schwesinger R. et al, in *"Chemistry a European Journal"* (2006), Vol. 12, pag. 429-437; Schwesinger R. et al, in "*Chemisty a European Journal*" (2006), Vol. 12, pag. 438-445; Martinsen A. et al, in "*Acta Chemica Scandinavica A*" (1977). Vol. 31, pag. 645-650. Some ionic compounds having general formula (III) are, instead, commercially available.

For the purpose of obtaining, at the end of the aforesaid process, a solution comprising polypropylene oxide and the catalytic system, said process may be carried out in the presence of an organic solvent.

In accordance with a preferred embodiment of the present disclosure, said process may be carried out in presence of at least one organic solvent which may be selected, for example, from: aliphatic hydrocarbons such as, for example, pentane, octane, decane, cyclohexane, or mixtures thereof; aromatic hydrocarbons such as, for example, benzene, toluene, xylene, or mixtures thereof; halogenated hydrocarbons such as, for example, dichloromethane, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromobenzene, or mixtures thereof; or mixtures thereof. Dichloromethane is preferred.

In accordance with a preferred embodiment of the present disclosure, said organic solvent may be used in a ratio by volume with respect to said propylene oxide comprised between 0:100 and 99:1, preferably comprised between 0:100 and 90:1.

In accordance with a further preferred embodiment, said propylene oxide acts as a solvent.

In accordance with a preferred embodiment of the present disclosure, in said process said catalytic system and said propylene oxide may be used in molar ratios comprised between 1:100 and 1:100000, preferably comprised between 1:1000 and 1:10000.

In accordance with a preferred embodiment of the present disclosure, in said catalytic system said at least one catalyst selected from transition metal complexes having general formula (I) and said at least one co-catalyst selected from ionic compounds having general formula (II) or general formula (III) may be used in a molar ratio comprised between 100:1 and 1:100, preferably comprised between 2:1 and 1:2.

In accordance with a preferred embodiment of the present disclosure, said process may be carried out at a temperature comprised between 0° C. and 250° C., preferably comprised between 10° C. and 120° C.

In accordance with a preferred embodiment of the present disclosure, said process may be carried out at a pressure comprised between 1 atm and 100 atm, preferably comprised between 2 atm and 60 atm.

In accordance with a preferred embodiment of the present disclosure, said process may be carried out for a time comprised between 30 minutes and 48 hours, preferably comprised between 2 hours and 30 hours.

The process according to the present disclosure may be carried out discontinuously (in batches), semi-continuously (in semi-batches), or continuously.

Preferably, the polypropylene carbonate obtained in accordance with the process object of the present disclosure, has a number average molecular weight ($M_n$) comprised between 10000 and 100000, more preferably comprised between 10000 and 60000, and a polydispersion index (PDI) corresponding to the ratio between the weight average molecular weight ($M_w$) and the number average molecular weight ($M_n$) (i.e. to the ratio $M_w/M_n$) comprised between 1.01 and 2.5, more preferably comprised between 1.01 and 1.4.

Preferably, the polypropylene carbonate obtained in accordance with the process object of the present disclosure, has a quantity of carbonate linkages in a chain greater than 85%, preferably greater than 95%, even more preferably equal to 100%.

The polypropylene carbonate obtained in accordance with the process object of the present disclosure, is easily degradable, does not form residues or ashes in combustion, and may be advantageously used for packaging, insulation and coatings.

As mentioned above, the subject matter of the present disclosure is also a catalytic system comprising: at least one catalyst selected from complexes of a transition metal having general formula (I); at least one co-catalyst selected from: (a) ionic compounds having general formula (II); (b) ionic compounds having general formula (I).

In order to better understand the present disclosure and to put it into practice, some illustrative and non-limiting examples thereof are reported below.

EXAMPLES

Reagents and Materials

The list below reports the reagents and materials used in the following examples of the disclosure, any pre-treatments thereof and their manufacturer:

- propylene oxide (Aldrich): purity 98%, distilled over calcium hydride ($CaH_2$) in an inert atmosphere;
- dichloromethane ($CH_2Cl_2$) (Aldrich) maintained at reflux temperature for 4 hours and distilled over calcium hydride ($CaH_2$);
- trichloromethane ($CHCl_3$) (Aldrich): used as such
- tetrphenylphosphonium chloride (TPPCl) (Aldrich): 98%, recrystallized twice from a dichloromethane ($CH_2Cl_2$)

(Aldrich)/diethyl ether $(C_2H_5)_2O$ (Aldrich) (1/10, v/v) mixture;

triphenyl(4-pyridinylmethyl)phosphonium chloride hydrochloride (UHFFA) (Aldrich): 98%, recrystallized twice from a dichloromethane $(CH_2Cl_2)$ (Aldrich)/diethyl ether $(C_2H_5)_2O$ (Aldrich) (1/10, v/v) mixture;

tetrakis[tris(dimethylamino)phosphoranylidenamino] phosphonium chloride (PPZCl) (Aldrich): used as such;

carbon dioxide $(CO_2)$ (Rivoira): pure, ≥99.8%, used as such;

5,10,15,20-tetraphenylporphyrin cobalt(II)(CoTTP) (Aldrich): used as such;

5,10,15,20-tetrakis(4-methoxyphenyl)porphyrin cobalt (II) (CoTMP) (Aldrich): used as such;

silver perchlorate $(AgClO_4)$ (anhydrous) (Aldrich): used as such;

acetonitrile $(CH_3CN)$ (anhydrous) (Aldrich): pure, ≥99.8%, used as such;

sodium azide $(NaN_3)$ (Aldrich): pure, ≥99.5%, used as such;

diethylether $(C_2H_5)_2O$ (Aldrich): used as such;

magnesium sulfate $(MgSO_4)$ (Merck): pure, ≥99.5%, used as such;

o-phenylenediamine (Aldrich): used as such;

3,5-di-tert-butylsalicylaldehyde (Aldrich): used as such;

methanol (MeOH) (anhydrous) (Aldrich): pure, ≥99.8%, used as such;

formic acid (HCOOH) (Aldrich): 95-97%, used as such;

sodium chloride (NaCl) (Aldrich): pure, ≥99%, used as such;

tetrahydrofuran (THF) (anhydrous) (Aldrich): used as such;

ammonium chloride $(NH_4Cl)$ (Merck): pure, ≥99.9%, used as such;

hydrochloric acid in 37% aqueous solution (Merck): used as such;

hydrobromic acid in 48% aqueous solution (Merck): used as such;

acetone $[(CH_3)_2O]$(Aldrich): used as such;

deuterated methylene chloride $(CD_2Cl_2)$ (Merck): used as it is.

Elemental Analysis a) Determination of Carbon, Hydrogen and Nitrogen

The determination of carbon, hydrogen, nitrogen, chromium and phosphorus in the compounds synthesized in the following examples, was carried out through a Carlo Erba automatic analyzer Mod. 1106.

NMR Spectra

The NMR spectra of the compounds synthesized in the following examples were acquired with an NMR Bruker Avance 400 spectrometer.

For that purpose, about 10 mg of the sample to be examined were dissolved in about 0.8 ml of $CD_2Cl_2$ (deuterated methylene chloride) directly in the glass tube used for the measurement. The chemical shift scale was calibrated in relation to the signal of the dichloromethane set to 5.30 ppm. The experimental parameters used were as follows:

128 scans;

90° pulse;

delay: 2 s, +4.5 s, acquisition time;

spectral amplitude: 7200 Hz.

Mass Spectra

The mass spectra were carried out with a Bruker Esquire 3000 Plus Ion Trap spectrometer equipped with a HPLC Agilent 1100 Series system and G 1329A ALS 1200 autosampler and Frizzier G1330B FC/ALS Therm and Ion Trap MS Esquire 3000 Plus detector, equipped with an Electro-Spray ionization source.

FT-IR Spectra(Solid State-ATR)

The FTIR-ATR spectra were recorded using a Perkin Elmer Spectrum Two spectrophotometer equipped with a UATR (Perkin Elmer) accessory that uses diamond/zinc selenide (ZnSe) crystals.

Absorption Spectra

The absorption spectra in solution of the polypropylene carbonates obtained, in ultraviolet and in visible light (UV-Vis) (250 nm-800 nm), were acquired in transmission using a double beam spectrophotometer and a Perkin Elmer λ950 double monochromator, provided with a double deuterium and tungsten lamp, a double monochromator with holographic reticles and a PbS Peltier photomultiplier.

Determination of the Molecular Weight

The determination of the molecular weight $(M_W)$ of the polypropylene carbonates obtained was carried out through GPC (Gel Permeation Chromatography), using the Waters® Alliance® GPC/V 2000 System by Waters Corporation which uses two detection lines: "Refractive Index"—RI and "Viscometer" operating under the following conditions:

two PLgel Mixed-B columns;

solvent/eluent: tetrahydrofuran (THF) (Aldrich);

flow rate: 0.6 ml/min;

temperature: 25° C.;

molecular mass calculation: Universal Calibration method.

The number average molecular weight $(M_n)$, the weight average molecular weight $(M_w)$ and the polydispersion index (PDI) (ratio $M_w/M_n$) are reported.

Example 1

Synthesis of 5,10,15,20-tetraphenylporphyrin cobalt(III) chloride (CoTPPCl)

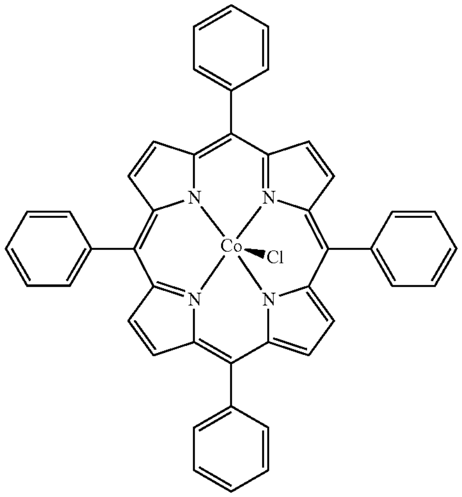

0.5 g (0.74 mmoles) of 5,10,15,20-tetraphenylporphyrin cobalt(II) (CoTPP) were suspended in 350 ml of a mixture of tricloromethane $(CHCl_3)$ and methanol (MeOH) (1/1; v/v) in a 200 ml two-neck flask and, subsequently, 4 ml of hydrochloric acid in 37% aqueous solution (first aliquot) were added. The solution immediately changed colour, but remained turbid and it was therefore heated to 50° C. and kept at said temperature, under stirring, for 5 hours, in the air. The progress of the reaction was observed through thin layer chromatography (TLC), using trichloromethane ($CHCl_3$) as an eluent. As the presence of 5,10,15,20-tetraphenylporphirine cobalt(II) (CoTPP) was observed, further additions of two 2 ml aliquots (24 mmoles) of hydrochloric acid in 37% aqueous solution were also added and the reaction mixture was maintained at 50° C., under stirring, for 12 hours after the addition of the second aliquot, and 24 hours, after the addition of the third aliquot. The progress of the reaction was further observed through thin layer chromatography (TLC), using trichloromethane ($CHCl_3$) as an eluent. As the absence of 5,10,15,20-tetraphenylporphirine cobalt(II) (CoTPP) was observed, the reaction mixture was left to cool to room temperature (25° C.) and filtered. The clear solution thus obtained was diluted with 100 ml of trichloromethane ($CHCl_3$), subsequently washed with water (3×100 ml) obtaining an aqueous phase and an organic phase that were separated using a separatory funnel. The organic phase obtained was anhydrified on magnesium sulfate ($MgSO_4$), filtered and the residual solvent was removed, under vacuum, obtaining 0.35 g of a purple coloured microcrystalline powder (yield 67%) corresponding to 5,10,15,20-tetraphenylporphirine cobalt(III) chloride (CoTPPCl).

Elemental analysis [found (calculated for $C_{44}H_{28}ClCoN_4$): C, 74.10% (74.74%); H, 4.10% (3.99%); N, 7.80% (7.92%).

ATR-IR, $cm^{-1}$ spectrum: 704(s), 755(s), 794(s), 836(s), 1005(s), 1074(s), 1179(m), 1352(s), 1441(m), 1490(m), 1599(m), 3026(w), 3055(w).

MS-EI (m/z) mass spectrum: [$M^+$] calculated for $C_{44}H_{28}ClCoN_4$ 706.133; found 671.3 $[M-Cl]^+$.

UV-Vis: $\lambda_{MAX\ ABS}$ spectrum=543 nm, 406 nm.

Example 2

Synthesis of 5,10,15,20-tetraphenylporphirine cobalt(III) bromide (CoTPPBr)

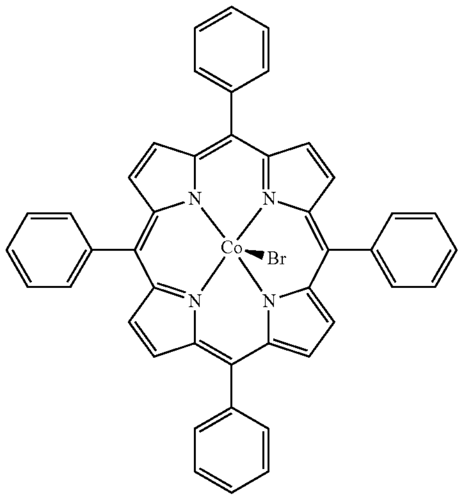

0.3 g (0.45 mmoles) of 5,10,15,20-tetraphenylporphyrin cobalt(II) (CoTPP) were suspended in 200 ml of a mixture of tricloromethane ($CHCl_3$) and methanol (MeOH) (1/1; v/v) in a 500 ml two-neck flask and, subsequently, 5.6 ml of hydrobromic acid in 48% aqueous solution were added. The solution immediately changed colour, but remains turbid and was, therefore, left, under stirring, at room temperature (25° C.), for 12 hours, in the air, obtaining a clear solution. The clear solution thus obtained was diluted with 50 ml of trichloromethane ($CHCl_3$), subsequently washed with water (3×100 ml) obtaining an aqueous phase and an organic phase that were separated using a separatory funnel. The organic phase obtained was anhydrified on magnesium sulfate ($MgSO_4$), filtered and the residual solvent was removed, under vacuum, obtaining 0.3 g of a green coloured microcrystalline powder (yield 90%) corresponding to 5,10,15,20-tetraphenylporphirine cobalt(III) bromide (CoTPPBr).

Elemental analysis [found (calculated for $C_{44}H_{28}BrCoN_4$): C, 69.80% (70.32%); H, 3.90% (3.76%); N, 7.0% (7.45%).

MS-EI (m/z) mass spectrum: [$M^+$] calculated for $C_{44}H_{28}BrCoN_4$ 750.083; found 671.1 $[M-Br]^+$.

UV-Vis: $\lambda_{MAX\ ABS}$ spectrum=542 nm, 406 nm.

Example 3

Synthesis of 5,10,15,20-tetraphenylporphirine cobalt(III) azide ($CoTPPN_3$)

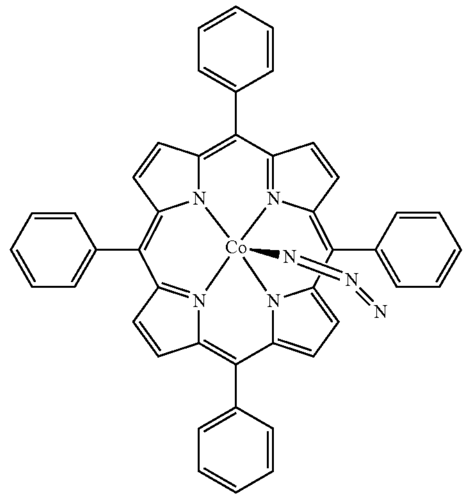

0.22 g (0.31 mmoles) of 5,10,15,20-tetraphenylporphirine cobalt(III) chloride (CoTPPCl) obtained as described in Example 1, were dissolved in 20 ml of acetonitrile ($CH_3CN$) mixture of trichloromethane ($CHCl_3$) and methanol (MeOH) (1/1; v/v) in a 200 ml two-neck flask and, subsequently, using a dropping funnel, 10 ml of a solution of silver perchlorate ($AgClO_4$) anhydrous 0.07 g (0.34 mmoles) in acetonitrile ($CH_3CN$) were added. The reaction mixture obtained was left, under stirring, at room temperature (25° C.), for 18 hours: in this phase the formation of a clear precipitate of silver chloride (AgCl) was observed. Subsequently the reaction was filtered and to the clear solution obtained 0.06 g (0.92 mmoles) of sodium azide ($NaN_3$) were added: everything was left, under stirring at room temperature (25° C.), for 18 hours for the purpose of promoting the slow dissolution of the sodium azide ($NaN_3$) in acetonitrile ($CH_3CN$). The clear solution thus obtained was diluted with 50 ml of diethylether $[C_2H_5)_2O]$, subsequently washed with water (3×100 ml) obtaining an aqueous phase and an organic phase that were separated using a separatory funnel. The organic phase obtained was anhydrified on magnesium sulfate ($MgSO_4$), filtered and the residual solvent was removed, under vacuum, obtaining 0.1 g of a red coloured microcrystalline powder (yield 47%) corresponding to 5,10,15,20-tetraphenylporphirine cobalt(III) azide ($CoTPPN_3$).

Elemental analysis [found (calculated for $C_{44}H_{28}CoN_7$): C, 73.50% (73.95%); H, 4.30% (4.09%); N, 13.1% (13.72%).

ATR-IR, $cm^{-1}$ spectrum: 704(s), 755(s), 794(s), 836(s), 1005(s), 1074(s), 1179(m), 1352(s), 1441(m), 1490(m), 1599(m), 1995 (s), 3026(w), 3055(w).

Example 4

Synthesis of 5,10,15,20-tetrakis(4-methoxyphenyl)porphirine cobalt(III) chloride (CoTMPCl)

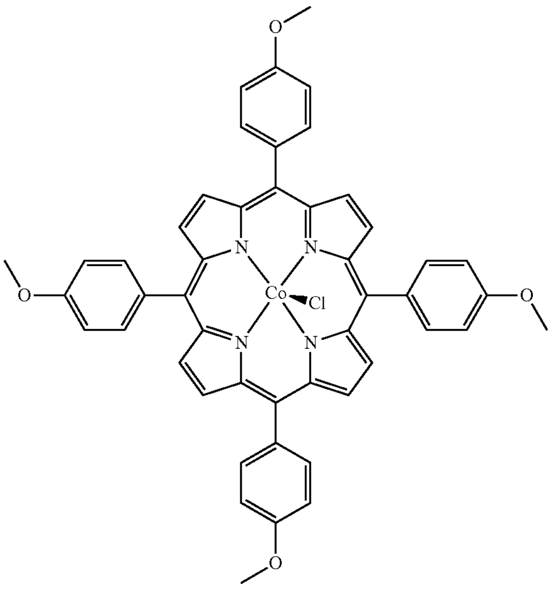

0.57 g (0.72 mmoles) of 5,10,15,20-tetrakis(4-methoxyphenyl)porphirine cobalt(II) (CoTMP) were suspended in 350 ml of a mixture of tricloromethane ($CHCl_3$) and methanol (MeOH) (1/l; v/v) in a 500 ml two-neck flask and, subsequently, 4 ml of hydrochloric acid in 37% aqueous solution (first aliquot) were added. The solution immediately changed colour, but remained turbid and it was therefore heated to 50° C. and kept at said temperature, under stirring, for 5 hours, in the air. The progress of the reaction was observed through thin layer chromatography (TLC), using trichloromethane ($CHCl_3$) as an eluent. As the presence of 5,10,15,20-tetrakis(4-methoxyphenyl)porphirine cobalt(II) (CoTMP) was observed, further additions of two 3 ml aliquots (36 mmoles) of hydrochloric acid in 37% aqueous solution were also added and the reaction mixture was maintained at 50° C., under stirring, for 12 hours after the addition of the second aliquot, and 24 hours, after the addition of the third aliquot. The progress of the reaction was further observed through thin layer chromatography (TLC), using trichloromethane ($CHCl_3$) as an eluent. As the absence of 5,10,15,20-tetrakis(4-methoxyphenyl)porphirine cobalt (II) (CoTMP) was observed, the reaction mixture was left to cool to room temperature (25° C.) and filtered. The clear solution thus obtained was diluted with 100 ml of trichloromethane ($CHCl_3$), subsequently washed with water (3×100 ml) obtaining an aqueous phase and an organic phase that were separated using a separatory funnel. The organic phase obtained was anhydrified on magnesium sulfate ($MgSO_4$), filtered and the residual solvent was removed, under vacuum, obtaining 0.4 g of a purple coloured microcrystalline powder (yield 67%) corresponding to 5,10,15,20-tetrakis(4-methoxyphenyl)porphirine cobalt(II) (CoTMP).

Elemental analysis [found (calculated for $C_{44}H_{36}ClCoN_4$): C, 69.90% (69.69%); H, 4.80% (4.39%); N, 6.10% (6.77%).

ATR-IR, $cm^{-1}$ spectrum: 724(m), 803(s), 984(m), 1010 (m), 1174(s), 1235(s), 1292(m), 1349(m), 1483(m), 1506 (m), 1597(m), 2833(w), 2959(w), 3357(w), 3429(w).

Examples 5-10

Preparation of Polypropylene Carbonate (Variable Pressure)

A 250 ml steel autoclave was sanitized with thorough washing with acetone [$(CH_3)_2O$] and anhydrous methanol (MeOH) and subsequently maintained, under vacuum, at 80° C., for 12 hours.

In the meantime, in a dry box, 0.081 g (0.115 mmoles) of 5,10,15,20-tetraphenylporphirine cobalt(III) chloride (CoTPPCl) obtained as described in Example 1 and 0.025 mg (0.058 mmoles) of triphenyl(4-pyridinylmethyl)phosphonium chloride hydrochloride (UHFFA) were weighed in a Schlenk flask, and subsequently 5 ml of dichloromethane ($CH_2C_2$) were added: the mixture obtained was left, under stirring, at room temperature (25° C.), for 1 hour. The solvent was subsequently removed, under vacuum and subsequently to the catalytic system obtained 25 ml of propylene oxide were added: the reaction mixture obtained was left, under stirring, at room temperature (25° C.), for 15 minutes and subsequently introduced, under vacuum, into an autoclave at working temperature, i.e. room temperature (25° C.). Once introduced into the autoclave, the reaction mixture was maintained, under stirring for 2 minutes and, subsequently, carbon dioxide ($CO_2$) was introduced at a pressure of 20 atm. The polymerization reaction was carried out for 24 hours, at the end of which, the pressure inside the autoclave had dropped to 10 atm. Subsequently, the pressure was brought to 1 atm.

The semisolid viscous solution obtained was collected from the autoclave and purified through dissolution in dichloromethane ($CH_2Cl_2$) (20 ml) and precipitation with 100 ml of a methanol (MeOH)/hydrochloric acid (HCl) (9/1, v/v) solution. The precipitated solid was collected by filtration, dried at reduced pressure, at ambient temperature (25° C.) and finely ground.

Examples 6-10 were carried out operating under the same conditions described above with the only difference being the use of different catalytic systems (i.e. different catalysts and co-catalysts). In particular:

- Example 6: 0.081 g (0.115 mmoles) of 5,10,15,20-tetraphenylporphirine cobalt(III) chloride (CoTPPCl) obtained as described in Example 1 and 0.022 g (0.058 mmoles) of tetraphenyl phosphonium chloride (TPPCl);
- Example 7: 0.081 g (0.115 mmoles) of 5,10,15,20-tetraphenylporphirine cobalt(III) chloride (CoTPPCl) obtained as described in Example 1 and 0.045 g (0.058 mmoles) of tetrakis[tris(dimethylamino)phosphoranylidenamino]phosphonium chloride (PPZCl);
- Example 8: 0.095 g (0.115 mmoles) of 5,10,15,20-tetrakis (4-methylphenyl)porphirine cobalt(III) chloride (CoTMPCl) obtained as described in Example 4 and 0.025 g (0.058 mmoles) of triphenyl(4-pyridinylmethyl)phosphonium chloride hydrochloride (UHFFA);

Example 9: 0.095 g (0.115 mmoles) of 5,10,15,20-tetrakis (4-methylphenyl)porphirine cobalt(III) chloride (CoTMPCl) obtained as described in Example 4 and 0.022 g (0.058 mmoles) of tetraphenyl phosphonium chloride (TPPCl), Example 10: 0.095 g (0.115 mmoles) of 5,10,15,20-tetrakis(4-methylphenyl)porphirine cobalt(III) chloride (CoTMPCl) obtained as described in Example 4 and 0.045 g (0.058 mmoles) of terakis[tris(dimethylamino) phosphoranylidenamino]phosphonium chloride (PPZCl);

The polypropylene carbonate obtained from each example was subsequently characterized by means of (DSC) (Differential Scanning Calorimetry) and GPC (Gel Permeation Chromatography): the results obtained are reported in Table 4 in which they are reported in the order: Example number, type and quantity in mmoles of catalyst, type and quantity in mmoles of co-catalyst, polymerization pressure (P) in bar, conversion expressed as a percentage and measured by means of NMR ($^1$H-NMR) spectrum on the reaction crude in order to determine the quantity of propylene oxide converted into polypropylene carbonate or propylene carbonate, the selectivity expressed as a percentage and measured through NMR ($^1$H-NMR) spectrum on the reaction crude so as to determine the quantity of propylene carbonate obtained with respect to the quantity of polypropylene carbonate obtained, the quantity of ether linkages present in the polypropylene carbonate obtained after purification expressed as a percentage and measured by means of NMR ($^1$H-NMR) spectrum, the number average molecular weight ($M_n$) in g/mole, the weight average molecular weight ($M_w$) in g/mole, the polydispersity index (PDI) (ratio $M_w/M_n$).

TABLE 4

| Example | Catalyst (mmoles) | Co-catalyst (mmoles) | P (bar) | Conv. (%) | Sel. (%) | L. E. (%) | $M_n$ (g/mole) | $M_w$ (g/mole) | $M_w/M_n$ |
|---|---|---|---|---|---|---|---|---|---|
| 5 | CoTPPCl (0.115) | UHFFA (0.058) | 20 | 22 | >99 | — | 17100 | 18640 | 1.09 |
| 6 | CoTPPCl (0.115) | TPPCl (0.058) | 20 | 28 | >99 | — | 11000 | 11990 | 1.09 |
| 7 | CoTPPCl (0.115) | PPZCl (0.058) | 20 | 30 | 46 | 8 | — | — | — |
| 8 | CoTMPCl (0.115) | UHFFA (0.058) | 20 | 42 | >99 | — | 15200 | 16570 | 1.09 |
| 9 | CoTMPCl (0.115) | TPPCl (0.058) | 20 | 4 | 94 | 9 | — | — | — |
| 10 | CoTMPCl (0.115) | PPZCl (0.058) | 20 | 90 | 66 | 11 | 54500 | 73030 | 1.34 |

The invention claimed is:

1. Process for the preparation of polypropylene carbonate comprising the copolymerization of propylene oxide and carbon dioxide ($CO_2$) in the presence of a catalytic system comprising:

at least one catalyst selected from complexes of a transition metal having general formula (I):

(I)

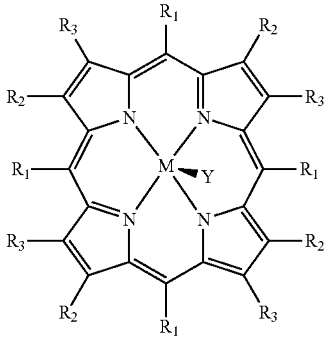

wherein:

M represents a metal atom selected from the group consisting of chromium, manganese, iron, cobalt, nickel, and aluminum;

Y represents a halide anion; or it is selected from inorganic anions; or it is selected from organic anions;

$R_1$ represents a hydrogen atom; or it is selected from linear or branched, saturated or unsaturated, $C_1$-$C_{20}$ alkyl groups, optionally containing heteroatoms, optionally substituted aryl groups, heteroaryl groups optionally substituted, the optionally substituted heteroaryl groups being optionally in cationic form, and cycloalkyl groups optionally substituted;

$R_2$ and $R_3$, mutually identical or different, represent a hydrogen atom; or they are selected from linear or branched, saturated or unsaturated, $C_1$-$C_{20}$, alkyl groups, optionally containing heteroatoms, aryl groups optionally substituted, heteroaryl groups optionally substituted, cycloalkyl groups optionally substituted, heterocyclic groups optionally substituted, trialkyl- or triaryl-silyls groups optionally substituted;

or $R_2$ and $R_3$ are optionally bound together so as to form, together with the atoms to which they are bound, a saturated, unsaturated or aromatic cycle containing from 3 to 12 carbon atoms, optionally polycondensed, which are optionally substituted with linear or branched, saturated or unsaturated, $C_1$-$C_{20}$ alkyl groups, optionally containing heteroatoms, aryl groups optionally substituted, heteroaryl groups optionally substituted, cycloalkyl groups optionally substituted, heterocyclic groups optionally substituted, trialkyl- or triaryl-silyl groups, dialkyl- or diaryl-amine groups, linear or branched, saturated or unsaturated $C_1$-$C_{20}$ alkoxy groups, aryloxy groups optionally substituted, thioalkoxy or thioaryloxy groups optionally substituted, cyano groups, the cycle optionally containing heteroatoms;

at least one co-catalyst selected from:

(a) ionic compounds having general formula (II):

(II)

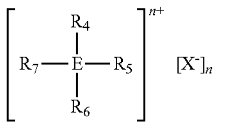

wherein:

E represents an atom selected from the group consisting of phosphorus, arsenic, antimony, and bismuth;

$R_4$, $R_5$, $R_6$ and $R_7$, mutually identical or different, represent a hydrogen atom; or they represent a halogen atom; or they are selected from the group consisting of linear or branched, saturated or unsaturated $C_1$-$C_{20}$ alkyl groups, optionally containing heteroatoms, aryl groups optionally substituted, heteroaryl groups optionally substituted, the heteroaryl groups optionally substituted being optionally in the cationic form, cycloalkyl groups optionally substituted, and heterocyclic groups optionally substituted, the optionally substituted heterocyclic groups being optionally in the cationic form;

or $R_4$ and $R_5$ and/or $R_5$ and $R_6$ and/or $R_6$ and $R_7$ and/or $R_7$ and $R_4$ are optionally bound together so as to form together with the other atoms to which they are bound a saturated, unsaturated or aromatic cycle containing from 1 to 12 carbon atoms, which are linear or branched, saturated or unsaturated $C_1$-$C_{20}$ alkyl groups optionally substituted, optionally containing heteroatoms, aryl groups optionally substituted, heteroaryl groups optionally substituted, cycloalkyl groups optionally substituted, heterocyclic groups optionally substituted, trialkyl- or triarylsilyl groups, dialkyl- or diaryl-amino groups, dialkyl- or diaryl-phosphine groups, linear or branched, saturated or unsaturated $C_1$-$C_{20}$ alkoxy groups, aryloxy groups optionally substituted, thioalkoxy or thioaryloxy groups optionally substituted, cyano groups, the cycle optionally containing heteroatoms;

$X^-$ represents a halogen anion; or it is selected from inorganic anions; or it is selected from organic anions;

n is an integer between 1 and 4;

provided that at least three of $R_4$, $R_5$, $R_6$ and $R_7$ are different from hydrogen;

(b) ionic compounds having general formula (III):

(III)

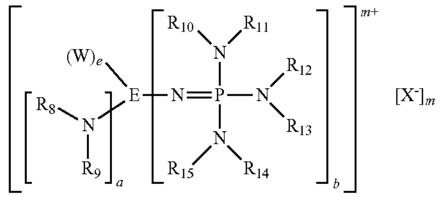

wherein:

E represents an atom selected from phosphorus, arsenic, antimony, and bismuth;

$R_8$, $R_9$, $R_{10}$, $R_{11}$, $R_{12}$, $R_{13}$, $R_{14}$ and $R_{15}$, mutually identical or different, represent a hydrogen atom; or they are selected from linear or branched, saturated or unsaturated $C_1$-$C_{20}$ alkyl groups, optionally containing heteroatoms, aryl groups optionally substituted, heteroaryl groups optionally substituted, the heteroaryl groups optionally substituted being optionally in cationic form, cycloalkyl groups optionally substituted, heterocyclic groups optionally substituted, the optionally substituted heterocyclic groups being optionally in cationic form, trialkyl- or triaryl-silyl groups;

or $R_8$ and $R_9$, and/or $R_{10}$ and $R_{11}$, and/or $R_{11}$ and $R_{12}$, and/or $R_{12}$ and $R_{13}$, and/or $R_{13}$ and $R_{14}$, and/or $R_{14}$ and $R_{15}$ are optionally bound together so as to form together with the other atoms to which they are bound a saturated, unsaturated or aromatic cycle containing from 2 to 12 carbon atoms, which are optionally substituted with linear or branched, saturated or unsaturated $C_1$-$C_{20}$ alkyl groups, optionally containing heteroatoms, aryl groups optionally substituted, heteroaryl groups optionally substituted, cycloalkyl groups optionally substituted, heterocyclic groups optionally substituted, trialkyl- or triaryl-silyl groups, dialkyl- or diaryl-amino groups, dialkyl- or diaryl-phosphine groups, linear or branched, saturated or unsaturated $C_1$-$C_{20}$ alkoxy groups, aryloxy groups optionally substituted, thioalkoxy or thioaryloxy groups optionally substituted, cyano groups, the cycle optionally containing heteroatoms;

W represents a halogen atom; or it is selected from linear or branched, saturated or unsaturated $C_1$-$C_{20}$ alkoxy groups, aryloxy groups optionally substituted, and oxylamine groups;

$X^-$ represents a halide anion; or it is selected from inorganic anions; or it is selected from organic anions; or it is selected from tetra-alkylborate anions optionally containing heteroatoms; tetra-arylborate anions optionally containing heteroatoms; and an azide anion;

a is an integer between 0 and 4;

b is an integer between 0 and 4;

c is 0 or 1;

provided that the sum a+b+c is equal to 4 and that at least one of a and b is different from 0; and m is an integer between 1 and 4.

2. Process for the preparation of polypropylene carbonate according to claim 1, wherein the process is carried out in the presence of at least one organic solvent selected from:

aliphatic hydrocarbons; aromatic hydrocarbons; halogenated hydrocarbons; or mixtures thereof.

3. The process of claim 2, wherein aliphatic hydrocarbons are selected from the group consisting of pentane, octane, decane, cyclohexane, and mixtures thereof;

wherein aromatic hydrocarbons are selected from the group consisting of benzene, toluene, xylene, and mixtures thereof; wherein halogenated hydrocarbons are selected from the group consisting of dichloromethane, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, bromobenzene, or mixtures thereof; and mixtures thereof.

4. The process of claim 3, wherein the halogenated hydrocarbons is dichloromethane.

5. Process for the preparation of polypropylene carbonate according to claim 1, wherein the propylene oxide acts as a solvent.

6. Process for the preparation of polypropylene carbonate according to claim 1, wherein:

the catalytic system and the propylene oxide are used in a molar ratio between 1:100 and 1:100000; and/or in the catalytic system, the at least one catalyst selected from complexes of a transition metal having general formula (I) and the at least one co-catalyst selected from ionic compounds having general formula (II) or general formula (III) are used in a molar ratio between 100:1 and 1:100.

7. The process of claim 6, wherein the catalytic system and the propylene oxide are used in a molar ratio between 1:1000 and 1:10000; and wherein the at least one catalyst and the at least one co-catalyst are used in a molar ratio between 2:1 and 1:2.

8. Process for the preparation of polypropylene carbonate according to claim 1, wherein the process is carried out;

at a temperature between 0° C. and 250° C.; and/or at a pressure between 1 atm and 100 atm; and/or for a time between 30 minutes and 48 hours.

9. The process of claim 8, wherein the temperature is between 10° C. and 120° C.; and/or the pressure is between 2 atm and 60 atm; and/or the time is between 2 hours and 30 hours.

10. The process of claim 1, wherein the halide anion of Y is selected from the group consisting of a fluoride anion, a chloride anion, a bromide anion, and an iodide anion; wherein the inorganic anion of Y is selected from the group consisting of azide anions, hydroxide anions, amide anions, a perchlorate anions, chlorate anions, sulfate anions, phosphate anions, and a nitrate anions; wherein the organic anions of Y are selected from the group consisting of $C_1$-$C_{30}$ carboxylate anions; $C_1$-$C_{20}$ alcoholate anions; $C_1$-$C_{20}$ thioalcoholate anions; and an $C_1$-$C_{30}$ alkyl or dialkyl-amide anion; wherein the $C_1$-$C_{20}$ thioalcoholate anions are selected from the group consisting of thioethoxide anion, thiophenoxide anion; wherein the $C_1$-$C_{30}$ alkyl or dialkyl-amide anion is selected from the group consisting of di-methyl-amide anion, di-iso-propylamide anion, diphenyl-amide anion; wherein the $C_1$-$C_{20}$ alkoxy groups are selected from the group consisting of $C_2$-$C_{10}$ alkoxy groups; wherein the heteroatoms of the cycle of $R_2$ and $R_3$ are selected from the group consisting of oxygen, sulfur, nitrogen, silicon, phosphorus, and selenium; wherein the heteroatoms the cycle of $R_4$ and $R_5$ and/or $R_5$ and $R_6$ and/or $R_6$ and $R_7$ and/or $R_7$ and $R_4$ are selected from the group consisting of oxygen, sulfur, nitrogen, silicon, phosphorus, and selenium; wherein E is phosphorus; wherein the halogen atom of $R_4$, $R_5$, $R_6$ and $R_7$ is selected from the group consisting of fluorine, chlorine, and bromine; wherein the halogen anion of $X^-$ of general formula (II) is selected from the group consisting of a fluoride anion, a chloride anion, a bromide anion, and an iodide anion; wherein the inorganic anions of $X^-$ of general formula (II) are selected from the group consisting of azide anion, perchlorate anion, chlorate anion, sulfate anion, phosphate anion, nitrate anion, hexafluorophosphate anion, and tetrafluoroborate anion; wherein the organic anions of $X^-$ of general formula (II) are selected from the group consisting of benzenesulfonate anion, toluenesulfonate anion, dodecylsulfate anion, octylphosphate anion, dodecylphosphate anion, octadecylphosphate anion, phenylphosphate anion, and tetraphenylborate anion; wherein n is an integer of 1 or 2; wherein the $C_1$-$C_{20}$ alkyl groups of $R_8$, $R_9$, $R_{10}$, $R_{11}$, $R_{12}$, $R_{13}$, $R_{14}$ and $R_{15}$ are $C_1$-$C_{12}$ alkyl groups; wherein the heteroatoms of the cycle of $R_8$ and $R_9$, and/or $R_{10}$ and $R_{11}$, and/or $R_{11}$ and $R_{12}$, and/or $R_{12}$ and $R_{13}$, and/or $R_{13}$ and $R_{14}$, and/or $R_{14}$ and $R_{15}$ are selected from the group consisting of oxygen, sulfur, nitrogen, silicon, phosphorus, and selenium; wherein the halogen atom of W is selected from the group consisting of chlorine, bromine, fluorine, and iodine; wherein the $C_1$-$C_{20}$ alkoxy groups of W are $C_1$-$C_{10}$ alkoxy groups; wherein the halide anion of $X^-$ of general formula (III) is selected from the group consisting of a fluoride anion, a chloride anion, a bromide anion, and an iodide anion; wherein the inorganic anions of $X^-$ of general formula (III) are selected from the group consisting of azide anion, perchlorate anion, chlorate anion, sulfate anion, phosphate anion, nitrate anion, hexafluorophosphate anion, and tetrafluoroborate anion; wherein the organic anions of $X^-$ of general formula (III) is selected from the group consisting of benzenesulfonate anion, toluenesulfonate anion, dodecylsulfate anion, octyl phosphate anion, dodecylphosphate anion, octadecylphosphate anion, and phenylphosphate anion; wherein the tetra-alkylborate anions of $X^-$ of general formula (III) are selected from the group consisting of oxygen and nitrogen; wherein the heteroatoms of the tetra-arylborate anions of $X^-$ of general formula (III) are selected from the group consisting of oxygen and nitrogen; wherein a is an integer from 1 to 3; wherein b is an integer from 1 to 4; wherein c is 0; and wherein m is 1 or 2.

11. The process of claim 10, wherein the $C_1$-$C_{30}$ carboxylate anions are selected from the group consisting of an acetate anion, a butyrate anion, 2-ethyl-hexanoate anions, acrylate anions, methyl methacrylate anions, benzoate anions, and trifluoroacetate anions; wherein $C_1$-$C_{20}$ alcoholate anions are selected from the group consisting of methoxide anions, ethoxide anion, tert-butoxide anions, phenoxide anions, 2,4,6-trimethylphenoxide anions, and 4-tert-butyl-phenoxide anions; wherein the $C_1$-$C_{20}$ thioalcoholate anions are selected from the group consisting of thioethoxide anions, thiophenoxide anions, $C_1$-$C_{30}$ alkyl or dialkyl-amide anions, di-iso-propylamide anions, and diphenyl-amide anions; wherein the halide anion of Y is selected from the group consisting of chloride anion and a bromide anion; wherein the inorganic anions are azide anions; wherein heteroatoms are selected from the group consisting of oxygen and nitrogen; wherein the heteroatoms the cycle of $R_2$ and $R_3$ are selected from the group consisting of oxygen and nitrogen; wherein the heteroatoms the cycle of $R_4$ and $R_5$ and/or $R_5$ and $R_6$ and/or $R_6$ and $R_7$ and/or $R_7$ and $R_4$ are selected from the group consisting of oxygen and nitrogen; wherein the halogen atom of $R_4$, $R_5$, $R_6$ and $R_7$ is selected from the group consisting of fluorine and bromine; wherein the halogen anion of $X^-$ of general formula (II) is selected from the group consisting of the chloride anion and the bromide anion; wherein the inorganic anions of $X^-$ of general formula (II) are selected from the group consisting of azide anion, sulfate anion, and tetrafluoroborate anion; wherein the heteroatoms of the cycle of $R_8$ and $R_9$, and/or $R_{10}$ and $R_{11}$, and/or $R_{11}$ and $R_{12}$, and/or $R_{12}$ and $R_{13}$, and/or $R_{13}$ and $R_{14}$, and/or $R_{14}$ and $R_{15}$ are selected from the group consisting of oxygen and nitrogen; wherein the halogen atom of W is selected from the group consisting of chlorine and bromine; wherein the tetra-alkylborate anions of $X^-$ of general formula (III) are selected from the group consisting of oxygen and nitrogen; and wherein the halide anion of $X^-$ of general formula (III) is a chloride anion.

12. The process of claim 11, wherein the $C_1$-$C_{30}$ alkyl or dialkyl-amide anion is di-methyl-amide anion.

13. A transition metal complex having general formula (Ia):

(Ia)

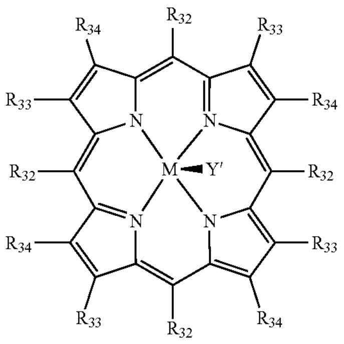

wherein:

M represents a metal atom selected from the group consisting of chromium and cobalt;

Y' represent an azide anion;

$R_1$ represents a hydrogen atom; or it is selected from the group consisting of linear or branched, saturated or unsaturated, $C_1$-$C_{12}$ alkyl groups, optionally containing heteroatoms, aryl groups optionally substituted, heteroaryl groups optionally substituted, the heteroaryl groups optionally substituted being optionally in cationic form, cycloalkyl groups optionally substituted, and heterocyclic groups optionally substituted, the optionally substituted heterocyclic groups being optionally in cationic form;

$R_2$ and $R_3$, mutually identical or different, represent a hydrogen atom; or they are selected from the group consisting of linear or branched, saturated or unsaturated, $C_1$-$C_{12}$, alkyl groups, optionally containing heteroatoms, aryl groups optionally substituted, heteroaryl groups optionally substituted, cycloalkyl groups optionally substituted, heterocyclic groups optionally substituted, and trialkyl- or triaryl-silyls groups optionally substituted;

or $R_2$ and $R_3$ may be optionally bound together so as to form, together with the atoms to which they are bound, a saturated, unsaturated or aromatic cycle containing from 3 to 12 carbon atoms, optionally polycondensed, which may be optionally substituted with linear or branched saturated, unsaturated or aromatic, optionally polycondensed, $C_1$-$C_{12}$ alkyl groups, optionally containing heteroatoms, aryl groups optionally substituted, heteroaryl groups optionally substituted, cycloalkyl groups optionally substituted, heterocyclic groups optionally substituted, trialkyl- or triaryl-silyl groups, dialkyl- or diaryl-amine groups, linear or branched, saturated or unsaturated $C_2$-$C_{10}$ alkoxy groups, aryloxy groups optionally substituted, thioalkoxy or thioaryloxy groups optionally substituted, and cyano groups, the cycle optionally containing heteroatoms selected from the group of oxygen, sulfur, nitrogen, silicon, phosphorus, and selenium.

14. The transition metal complex of claim 13, wherein the heteroatoms of the cycle of $R_2$ and $R_3$ are selected from the group consisting of oxygen and nitrogen.

15. Process for the preparation of a transition metal complex having (Ib)

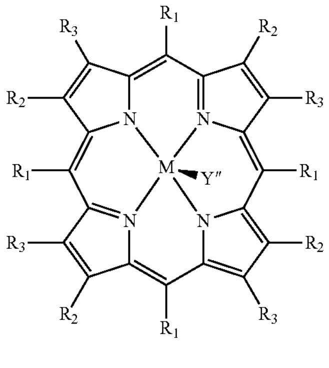

wherein:

M represents a metal atom selected from the group consisting of chromium, manganese, iron, cobalt, nickel, and aluminum;

$R_1$ represents a hydrogen atom; or it is selected from linear or branched, saturated or unsaturated, $C_1$-$C_{20}$ alkyl groups, optionally containing heteroatoms, optionally substituted aryl groups, heteroaryl groups optionally substituted, the optionally substituted heteroaryl groups being optionally in cationic form, and cycloalkyl groups optionally substituted;

$R_2$ and $R_3$, mutually identical or different, represent a hydrogen atom; or they are selected from linear or branched, saturated or unsaturated, $C_1$-$C_{20}$, alkyl groups, optionally containing heteroatoms, aryl groups optionally substituted, heteroaryl groups optionally substituted, cycloalkyl groups optionally substituted, heterocyclic groups optionally substituted, trialkyl- or triaryl-silyls groups optionally substituted;

or $R_2$ and $R_3$ are optionally bound together so as to form, together with the atoms to which they are bound, a saturated, unsaturated or aromatic cycle containing from 3 to 12 carbon atoms, optionally polycondensed, which are optionally substituted with linear or branched, saturated or unsaturated, $C_1$-$C_{20}$ alkyl groups, optionally containing heteroatoms, aryl groups optionally substituted, heteroaryl groups optionally substituted, cycloalkyl groups optionally substituted, heterocyclic groups optionally substituted, trialkyl- or triaryl-silyl groups, dialkyl- or diaryl-amine groups, linear or branched, saturated or unsaturated $C_1$-$C_{20}$ alkoxy groups, aryloxy groups optionally substituted, thioalkoxy or thioaryloxy groups optionally substituted, cyano groups, the cycle optionally containing heteroatoms; and wherein Y" represents a halide anion, comprising reacting at least one transition metal complex having general formula (IV):

(IV)

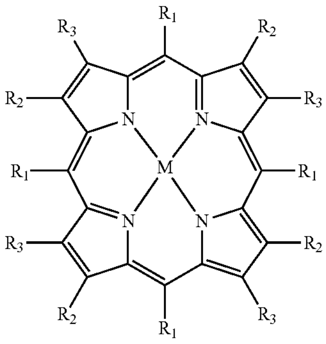

in the presence of at least one organic solvent selected from the group consisting of halogenated solvents and alcohols with at least one hydrogen halide acid; wherein the mixture of the transition metal complex has general formula (IV) and the organic solvent:

a first aliquot of the at least one hydrogen halide acid is added and the mixture obtained is left to react, at a temperature between 30° C. and 70° C., for a time of between 3 hours and 7 hours; and subsequently a second aliquot of the at least one hydrogen halide acid is added and the mixture obtained is left to react, at a temperature between 30° C. and 70° C., for a time of between 8 hours and 15 hours; and subsequently a third aliquot of the at least one hydrogen halide acid is added and the mixture obtained is left to react, at a temperature between 30° C. and 70° C. for a time of between 18 hours and 30 hours.

16. The process of claim 15, wherein Y" represents a fluoride anion, a chloride anion, a bromide anion, an iodide anion; wherein the halogenated solvents is selected from the group consisting of trichloromethane, dichloromethane, 1,2-dichloroethane, 1,1,1-trichloroethane, chlorobenzene, and mixtures thereof; wherein the alcohols with at least one hydrogen halide acid is selected from the group consisting of methanol, ethanol, iso-propanol, butanol, 1-octanol, and mixtures thereof; wherein the at least one hydrogen halide acid is selected from the group consisting of hydrochloric acid, hydrobromic acid, hydroiodic acid, hydrofluoric acid, and mixtures thereof; wherein the temperature of reacting of the first aliquot is between 40° C. and 60° C.; wherein the time of reacting of the first aliquot is between 4 hours and 6 hours; wherein the temperature of reacting of the second aliquot is between 40° C. and 60° C.; wherein the time of reacting of the second aliquot is between 10 hours and 13 hours; wherein the temperature of reacting of the third aliquot is between 40° C. and 60° C.; and wherein the time of reacting of the third aliquot is between 20 hours and 26 hours.

17. The process of claim 16, wherein the halogenated solvents is trichloromethane; wherein the alcohols is methanol; and wherein the at least one hydrogen halide acid is hydrochloric acid.

* * * * *